(12) United States Patent
Subramanian et al.

(10) Patent No.: US 8,600,411 B2
(45) Date of Patent: Dec. 3, 2013

(54) METHODS AND APPARATUS FOR CONTROLLING THE TRANSMISSION AND/OR RECEPTION OF SAFETY MESSAGES BY PORTABLE WIRELESS USER DEVICES

(75) Inventors: Sundar Subramanian, Bridgewater, NJ (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/570,109

(22) Filed: Aug. 8, 2012

(65) Prior Publication Data

US 2013/0210460 A1    Aug. 15, 2013

Related U.S. Application Data

(60) Provisional application No. 61/589,853, filed on Jan. 23, 2012, provisional application No. 61/590,025, filed on Jan. 24, 2012.

(51) Int. Cl.
*H04W 24/00* (2009.01)

(52) U.S. Cl.
USPC ..................................... 455/456.3

(58) Field of Classification Search
USPC ..................................... 455/456.3
See application file for complete search history.

(56) References Cited

U.S. PATENT DOCUMENTS

| | | |
|---|---|---|
| 6,321,091 B1 | 11/2001 | Holland |
| 7,426,197 B2 | 9/2008 | Schotten et al. |
| 7,689,230 B2 * | 3/2010 | Spadafora et al. ......... 455/456.1 |
| 2002/0115436 A1 | 8/2002 | Howell et al. |
| 2003/0144792 A1 | 7/2003 | Amano et al. |

(Continued)

FOREIGN PATENT DOCUMENTS

EP    1940124 A2    7/2008

OTHER PUBLICATIONS

Feng, Y., et al., "Adaptive Beacon Rate Adjusting mechanism for safety communication in cooperative IEEE 802.11p-3G vehicle-infrastructure systems", Communications (APCC), 2010 16th Asia-Pacific Conference on, IEEE, Piscataway, NJ, USA, Oct. 31, 2010, pp. 441-446, XP031843591, DOI: 10.1109/APCC.2010.5679988 ISBN: 978-1-4244-8128-6 p. 441, left-hand column, last paragraph-right-hand column, paragraph 1 p. 442, right-hand column, paragraph second last.

(Continued)

*Primary Examiner* — Temica M Beamer
*Assistant Examiner* — Joel Ajayi
(74) *Attorney, Agent, or Firm* — Joseph B. Agusta

(57) ABSTRACT

Safety message monitoring operations and/or safety message transmission operations are controlled for a mobile wireless communications device. The periodicity with regard to safety message monitoring and/or safety message transmissions is varied based on the environment of the mobile wireless device. The transmission power level with regard to safety message transmissions is varied based on the environment of the mobile wireless device. In some embodiments, safety message monitoring and transmission operations are disabled when the mobile device is determined to be inside a building or inside a vehicle. In some embodiments, safety message monitoring rate and safety message transmission rate is varied as a function of proximity to vehicular traffic and/or the level of detected vehicular traffic. In some embodiments, safety message transmission power level is varied as a function of proximity to vehicular traffic and/or the level of detected vehicular traffic.

14 Claims, 7 Drawing Sheets

(56) References Cited

U.S. PATENT DOCUMENTS

2007/0164896 A1    7/2007  Suzuki et al.
2011/0034183 A1*   2/2011  Haag et al. ............... 455/456.3
2011/0210866 A1    9/2011  David et al.

OTHER PUBLICATIONS

Fukui, R., et al., "Dynamic Integrated Transmission Control (DITRAC) Over Inter-Vehicle Communications in ITS", VTC Spring 2002. IEEE 55th. Vehicular Technology Conference. Proceedings. Birmingham, AL, May 6-9, 2002; [IEEE Vehicular Technolgy Conference], New York, NY: IEEE, US, vol. 1, May 6, 2002, pp. 483-487, XP001210433, DOI: 10.1109/VTC.2002.1002762 ISBN: 978-0-7803-7484-3 p. 484, right-hand column, paragraph 3-p. 485, left-hand column, paragraph 2.

International Search Report and Written Opinion—PCT/US2013/022721—ISA/EPO—May 24, 2013.

* cited by examiner

METHODS AND APPARATUS FOR CONTROLLING THE TRANSMISSION AND/OR RECEPTION OF SAFETY MESSAGES BY PORTABLE WIRELESS USER DEVICES

RELATED APPLICATIONS

The present application claims the benefit of U.S. Provisional Patent Application Ser. No. 61/590,025, filed Jan. 24, 2012, titled "METHODS AND APPARATUS TO OPERATE A CELLPHONE IN CONJUNCTION WITH A DSRC-ENABLED VEHICLE" and claims the benefit of U.S. Provisional Patent Application Ser. No. 61/589,853, filed Jan. 23, 2012, titled "APPARATUS AND METHOD FOR CONTROLLING TRANSMISSION AND RECEPTION OF BASIC SAFETY MESSAGES BY PEDESTRIAN USERS" both of which are assigned to the assignee of the present application and both of which are hereby expressly incorporated by reference in their entirety.

FIELD

Various embodiments are directed to controlling the transmission and reception of safety messages by portable wireless communications user devices, e.g., cell phones, laptops, and/or other handheld devices.

BACKGROUND

The 802.11p standard has been proposed for use in the 5.9 GHz spectrum for vehicular safety and commercial use. The FCC has allocated 7 channels of 10 MHz each for this purpose. It is envisioned that vehicles will periodically broadcast safety messages to indicate their position and velocity on the road.

The current 802.11p based DSRC wireless access in vehicular environments (WAVE) systems have a basic safety message format where vehicles periodically announce their position, velocity, and other attributes to other cars allowing the neighboring traffic to track the vehicles' positions and avoid collisions, improve traffic flow, etc. The standard does not preclude pedestrians from utilizing this spectrum and periodically transmitting basic safety messages which can indicate the pedestrians' presence to vehicles around them. However, the spectrum allocated for safety messages is different than that normally used by cell phones for voice communications.

Typically, in vehicular systems, the basic safety messages are transmitted and received periodically in a reserved channel, e.g., a safety channel or control channel, and the transmission periodicity can be as high as once every 50 milliseconds. For vehicular systems, this frequency may not be an excessive burden on the battery or the channel resources.

However, transmitting safety messages in the spectrum allocated for safety messages too often by a pedestrian's phone, assuming the phone includes a transmitter capable of using the spectrum allocated for safety messages, can be a drain on a phone's battery. In addition, the 802.11p spectrum for safety messages can become congested with little or no benefit if a large number of pedestrians' phones send out safety messages which are of little practical use, e.g., because the pedestrian is not close to a road or traffic.

To enable receipt of safety messages communicated in the spectrum allocated for safety messages may require an 802.11p radio to be switched on for significant durations of time and can be a burden in terms of consumption of battery power. Thus, keeping the receiver on, with regard to safety message operations, in an environment where a pedestrian user is not interacting with road traffic can lead to an unproductive use of battery resources.

Furthermore, a large number of pedestrian users who are not actively using a road may quickly congest the use of a safety channel. For example, the cell phones of driver and passenger of a vehicle may both transmit safety messages which are likely to be redundant when the vehicle in which the driver and passenger are located transmits safety messages.

In view of the above discussion, it should be appreciated that there is a need for methods and apparatus for controlling whether and/or when a device will transmit safety messages. It should be appreciated that it would be desirable if at least some methods and/or apparatus reduced and/or avoided the transmission of safety messages that are not likely to be useful and/or which provide redundant or similar information.

SUMMARY

Various embodiments relate to controlling the transmissions and/or reception of safety messages, e.g., dedicated short range communications (DSRC) safety messages, by portable wireless terminals, e.g., handheld or man portable wireless communications devices. Some features of various embodiments relate to methods and apparatus which can be used to control the operations of a cell phone or other portable wireless communications device when it operates within a vehicle enabled with a DSRC radio, e.g., an 802.11p radio.

Man portable wireless communications devices, e.g., cellphone devices, may and in some embodiments do transmit vehicular safety messages used to facilitate pedestrian and/or vehicle safety. For example, pedestrians using the road may use their cellphone devices to transmit their position and movement to vehicles/other pedestrians devices in the neighborhood so that the vehicles may avoid the pedestrian users and/or pedestrians can have an idea of congestion and/or other information useful in determining a safe and fast route.

In accordance with various embodiments, transmission and/or reception rates of messages from man portable devices, e.g., cell phones and/or other user equipment devices, is controlled based on location information and/or one or more received signals. In some embodiments, the rate of monitoring for and transmitting safety message is controlled to be lower than the rate used for vehicles thereby allowing for conservation of battery power, limiting congestion of airlink resources and also avoiding excessive loading on the processing resources of a portable device being used.

In one embodiment, the power and periodicity of a wireless device for use by a pedestrian are controlled with regard to safety messages. The power and periodicity may be varied according to the environment of the wireless device. In one embodiment, the position of the wireless device may, and sometimes is, used to adjust the power and/or periodicity of safety messages sent by the wireless device. In another embodiment, inertial measurements are used to predict the position of the pedestrian and adjust power and periodicity accordingly. In yet another embodiment, basic safety messages are monitored and the power and/or periodicity of messages sent by the wireless device are adjusted. In some embodiments, a basic safety message can be requested or polled by other devices. Various embodiments, may, and some do, combine and use the above described power and/or transmission control features, but all embodiments, need not include all the discussed features.

One particular exemplary embodiment is directed to a cell phone device, that can identify that it is within a building and which shuts off its DSRC safety messages for the duration that it detects it is within the building. Various methods of detecting whether the cellphone is within a building include: receiving a building audio identification signal, detecting a signal exceeding a predetermined receive power level from a base station transmitter known to be located within a building, determining a GPS position known to be within a building based on received GPS signals, determining a position known to be within a building based on inertial guidance information, and determining position based on detected RF signals and a RF fingerprint predication map corresponding to a building.

Another particular exemplary embodiment is directed to a cell phone device, that can identify that it is within a moving vehicle, e.g., a moving car. In some embodiments, the cell phone device, which has detected that it is in a moving vehicle with DSRC capability, shuts off its DSRC safety messages for the duration that it detects it is within the moving vehicle. Various methods of detecting whether the cellphone is within a moving vehicle, e.g., a moving car, are described including: receiving signals from a vehicle's, e.g., car's, audio system, detecting velocity consistent with vehicular motion, and/or detecting a radio signal or signals, e.g., safety messages, from a vehicle's, e.g., car's, DSRC system.

An exemplary method of operating a communications device, in accordance with some embodiments, includes generating device location information based on at least one of a received signal or inertial guidance information and controlling at least one of a safety message monitoring operation or safety message transmission operation based on the generated device location information. An exemplary communications device, in accordance with some embodiments, includes at least one processor configured to: (i) generate device location information based on at least one of a received signal or inertial guidance information; and (ii) control at least one of a safety message monitoring operation or safety message transmission operation based on the generated device location information. The exemplary communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
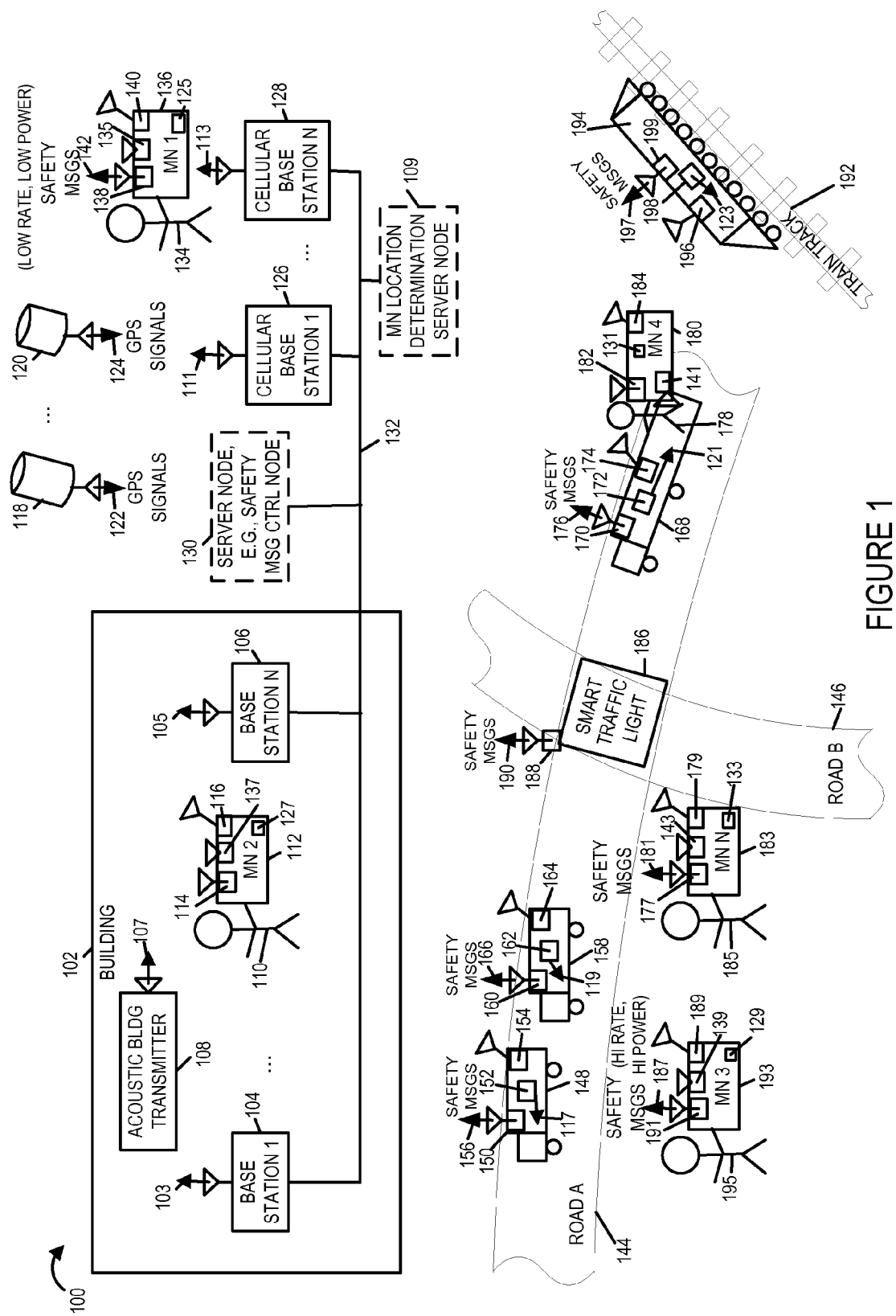
FIG. 1 is a drawing of an exemplary system supporting safety message signaling in accordance with various exemplary embodiments.

FIG. 1 is a drawing of an exemplary system 100 supporting the communications of safety messages, e.g. DSRC safety messages, in accordance with various exemplary embodiments. Exemplary system 100 includes a building 102 including a plurality of base stations (base station 1 104, . . . , base station N 106) and an acoustic building transmitter 108. The base stations (104, . . . , 106) transmit signals including RF reference signals (103, . . . , 105), respectively, which may be, and sometimes are, used for mobile device position determination within building 102, e.g., in accordance with a RF fingerprint map. Acoustic building transmitter 108 transmits acoustic signal 107 which may be, and sometimes is, used by detecting mobile communications devices to recognize that the detecting mobile device is currently located in building 102. In some embodiments, multiple acoustic transmitters are situated at different locations in the building facilitating ranging determination within the building by a mobile wireless communications device. System 100 further includes a plurality of cellular base stations (cellular base station 1 126, . . . , cellular base station N 128). The cellular base stations (126, . . . , 128) transmits signals including reference signals (111, . . . , 113), respectively, which may be, and sometimes are, used for mobile device position determination. In some embodiments, system 100 includes a server node 130, e.g., a safety message control node. In some embodiments, in which mobile wireless communications devices' positions are tracked using a centralized approach, system 100 includes mobile node (MN) location determination server 109. The various nodes (104, . . . , 106, 126, . . . , 128, 130, 109) are coupled to a backhaul network 132 over which the various devices may exchange data and information.

System 100 further includes a plurality of GPS satellites (GPS satellite 1 118, . . . , GPS satellite N 120) which transmit GPS signals (122, . . . , 124) respectively. The GPS signals (122, . . . , 124) may be, and sometimes are, received by devices with GPS receivers and used to determine time, device position, device velocity, device altitude, and/or device heading.

Exemplary system 100 also includes a plurality of roads (road A 144, . . . , road B 146), a smart traffic light 186 at an intersection, and a train track 192. There are a plurality of motor vehicles on the roads including vehicle 1 148, vehicle 2 158, and vehicle N 168). Each of the vehicles (148, 158, . . . , 168) includes a wireless communications module (150, 160, . . . , 170), respectively which supports the transmission and reception of safety messages. Wireless communications modules (150, 160, . . . , 170) transmit safety messages (156, 166, . . . , 176), respectively. Each of the vehicles (148, 158, . . . , 168) includes a GPS receiver module (154, 164, . . . , 174), respectively which supports the reception of GPS signals from GPS satellites. Each of the vehicles (148, 158, . . . , 168) includes an acoustic transmitter module (152, 162, . . . , 172), respectively which transmits an acoustic signal (117, 119, . . . , 121), respectively. An acoustic signal (117, 119, . . . , 121) transmitted by transmitter module (152, 162, ... 172), respectively, can be, and sometimes is, used by a mobile wireless communications device situated inside the vehicle (148, 158, ..., 168), respectively to recognize that the detecting mobile wireless communications device is within the vehicle (148, 158, ..., 168), respectively. In some embodiments, acoustic signals are transmitted from multiple speakers within a vehicle facilitating and a mobile communications device receiving the acoustic signals performs a range determination and determines whether or not the mobile communications device is located within the vehicle.

Smart traffic light 186 includes a wireless communications module 188 which supports the transmission and reception of safety messages. Train 194 includes a wireless communications module 199 which supports the transmission and reception of safety messages. Wireless communications module 199 transmits safety messages 197. Train 194 also includes a GPS receiver module 196 which supports the reception of GPS signals from GPS satellites. Train 194 further includes an acoustic transmitter module 198 which transmits an acoustic signal 123. An acoustic signal 123 transmitted by transmitter module 198 can be, and sometimes is, used by a mobile wireless communications device situated inside train 194 to recognize that the detecting mobile wireless communications device is within train 194.

System 100 also includes a plurality of portable mobile wireless communications devices (mobile node 1 136, mobile node 2 112, mobile node 3 193, mobile node 4 180, ..., mobile node N 183), which are held by operators (operator 1 134, operator 2 110, operator 3 195, operator 4 178, ..., operator N 185), respectively. Each of the mobile wireless communications devices (136, 112, 193, 180, ..., 183) supports the reception and transmission of safety messages via its wireless communications module (138, 114, 191, 182, ..., 177), respectively. Each of the mobile wireless communications devices (136, 112, 193, 180, ..., 183) supports the reception of GPS signals via its GPS receiver module (140, 116, 189, 184 ..., 179), respectively. Each of the mobile wireless communications devices (136, 112, 193, 180, ..., 183) includes a microphone and acoustic interface module (135, 137, 139, 141, ..., 143), respectively, which supports the capability to receive acoustic signals and identify that the mobile wireless communications device is within a building or vehicle or within a particular building or particular vehicle. Each of the mobile wireless communications devices (136, 112, 193, 180, ..., 183) also includes an inertial guidance module including gyroscopes and accelerometers (125, 127, 129, 131, ..., 133), respectively, which is used for determining position, velocity, and heading, aiding GPS, filling in for outages of GPS, and for measuring a velocity and acceleration. In some embodiments, measurements of velocity and acceleration are used to identify that a mobile wireless communications device is inside a moving vehicle.

In some embodiments, the rate at which safety messages are transmitted by mobile wireless communications devices of individuals is intentionally controlled to be less than the rate at which safety messages are transmitted by vehicles.

Consider one exemplary embodiment in which mobile wireless communications devices generate device location information and control safety message monitoring and/or safety message transmission based on the generated device location information. Operator 1 134 with MN 1 136 is not within a building or a vehicle. MN 1 136 is currently situated relatively far away from the roads and train track. MN 1 136 determines its position based on one or more of: received GPS signals (122, ..., 124), received signals (111, ..., 113) from cellular base stations (126, ..., 128), respectively, and inertial measurement information from inertial module 125. MN 1 136 determines that it is outside a vehicle and not in a building. MN 1 136 monitors safety messages from vehicles, e.g., in terms of number of messages received, signal strength level of received safety messages, number of safety messages received in a given time interval, number of different vehicles from which safety messages were received from, number of different vehicles from which safety messages are received in a given time interval, and/or percentage of monitoring time during which safety messages were received, to determine a level of vehicle activity in its region. In this example, MN 1 136 decides to transmit its safety messages 142 at a relatively low rate and a relatively low transmission power level. MN 1 136 also decides to monitor for safety messages at a relatively low rate.

Continuing with the example, operator 2 110 with MN 2 112 is within a building. MN 2 112 determines that it is in building 102 based on one or more of: received acoustic signal 107, signals (103, ..., 105) received from base stations (104, ..., 106), respectively, received GPS signals (122, ..., 124), and inertial measurement information from inertial module 127. MN 2 112 decides to refrain from receiving and transmitting safety messages while it is within the building.

Continuing with the example, operator 3 195 with MN 3 193 is not within a building or a vehicle. MN 3 193 is currently situated relatively close to the road A 144. MN 3 193 determines its position based on one or more of: received GPS signals (122, ..., 124), received signals (111, ..., 113) from cellular base stations (126, ..., 128), respectively, and inertial measurement information from inertial module 129. MN 3 193 determines that it is outside a vehicle and not in a building. MN 3 193 monitors safety messages from vehicles, e.g., in terms of number of messages received, signal strength level of received safety messages, number of safety messages received in a given time interval, number of different vehicles from which safety messages were received from, number of different vehicles from which safety messages are received in a given time interval, and/or percentage of monitoring time during which safety messages were received, to determine a level of vehicle activity in its region, and determines that the level of activity is relatively high. In this example, MN 3 193 decides to transmit its safety messages 187 at a relatively high rate and a relatively high transmission power level. MN 3 193 also decides to monitor for safety messages at a relatively high rate.

Continuing with the example, operator 4 178 with MN 4 180 is located within moving vehicle 168. MN 4 180 determines that it is within vehicle 168 and that the vehicle is moving based on one or more of: received acoustic signal 121, received safety messages 176 transmitted by vehicle 168, received GPS signals (122, ..., 124) and information obtained from its inertial module 131. MN 4 decides to refrain from transmitting safety messages while it is in vehicle 168. MN 4 decides to monitor for safety messages at a relatively low rate while it is in vehicle 168.

Continuing with the example, operator N 185 with MN N 183 is located close to the intersection between road A 144 and road B 146, and would like to cross from one side of road A to the other side of road A. Operator N 185 selects a push to cross button on MN N 183 resulting in the generation and transmission of safety message 181. The safety message 181 is received by module 188 of smart traffic light 186 which alters, e.g., shortens, the time between light transitions at traffic light 186. Safety messages 190 may include a message indicating the time remaining before a light transition occurs.

It should be appreciated that the mobile wireless communications devices (136, 112, 193, 180, ..., 183) may move throughout system 100 and an individual wireless communications device may alter its status with regard to whether or not it is monitoring for safety messages, safety message monitoring periodicity, percentage of time monitoring for safety messages, whether or not it is transmitting safety messages, safety message transmission periodicity, and/or safety message transmission power level, as a function of its detected environment. For example, consider that MN 1 136, as shown in FIG. 1 is transmitting safety messages at a low rate and low power level and is monitoring for safety messages at a low rate. Consider that MN 1 136 moves inside building 102, and ceases monitoring for and transmitting safety messages while inside building 102. Further consider that MN 1 136 leaves building 102 and returns to transmitting safety messages at a low power level and monitoring for safety messages at a low rate. Further consider as MN 1 136 approaches the ongoing traffic, MN 1 136 increases its safety message transmission power level and rate and increases its safety message monitoring rate. Further consider that MN 1 136 enters a vehicle and detects that the vehicle is moving; and in response ceases its safety message monitoring and safety message transmission since the vehicle has its own safety message signaling capability.

Consider another exemplary embodiment in which a network node, e.g., server node 130 which is a safety message control node, generates device location information for mobile wireless communications devices and controls safety message monitoring and/or safety message transmissions of the mobile wireless communications devices based on the generated device location information. Thus, in one embodiment, server node 130 controls safety message monitoring and/or safety message transmission for MN 1 136, MN 2 112, MN 3 193, MN 4 180, and MN N 183. Server node 130 collects information pertaining to the MNs and vehicles in the system, e.g., MN location, vehicle location, information used to derive MN location, information used to derive vehicle location, MN self-determinations as to whether or not it is in a building, MN self-determinations as to whether or not it is in a vehicle, velocity information, inertial information, safety message transmission rate, safety message power level information, and remaining battery power at an MN. Server node 130, which has an overall view of system 100, decides on: (i) whether or not a particular MN should be transmitting and/or monitoring for safety messages, (ii) safety message monitoring information for a particular MN, e.g., a monitoring rate and/or a monitoring duty cycle, when it is decided that the particular MN is to be monitoring for safety messages, (iii) a rate of transmission of safety messages for a particular MN when it is decided that safety messages should be transmitted by the MN, and (iv) a power level of transmission of safety messages when it decides that safety messages should be transmitted by the MN. The server node 130 generates and transmits a control message to each of the MNs to control safety message monitoring and transmission operations. The control message is communicated to the MN via one of the base stations (104, ..., 106, 126, ..., 128). The MN to which the control message is directed receives the control message and implements the control operations with regard to safety messages. In this example, MN 1 136 is controlled to monitor for safety messages at a relatively low rate and to transmit safety messages at a relatively low rate and relatively low power level. In this example, MN 2 112 is controlled to refrain from monitoring for and transmitting safety messages. In this example, MN 3 193 is controlled to monitor for safety messages at a relatively high rate and to transmit safety messages at a relatively high rate and relatively high power level. In this example, MN 4 180 is controlled to monitor for safety messages at a relatively low rate and to refrain from transmitting safety messages. In this example, MN N 183 is controlled to monitor for safety messages at a relatively high rate and to transmit safety messages at a relatively high rate and relatively high power level.

In some embodiments, the relatively high monitoring rate is a fixed predetermined rate HM and the relatively low monitoring rate is a fixed predetermined rate LM, where rate HM>rate LM. In some embodiments, the relatively high transmission rate is a fixed predetermined rate HT and the relatively low transmission rate is a fixed predetermined rate LT, where rate HT>rate LT. In some embodiments, the relatively high transmission power level is a fixed predetermined transmission power level HP and the relatively low transmission power level is a fixed predetermined transmission power level LP, where HP>LP. In various embodiments, HT is less than the safety message transmission rate used by vehicles to transmit basic safety messages.

Figure 2:
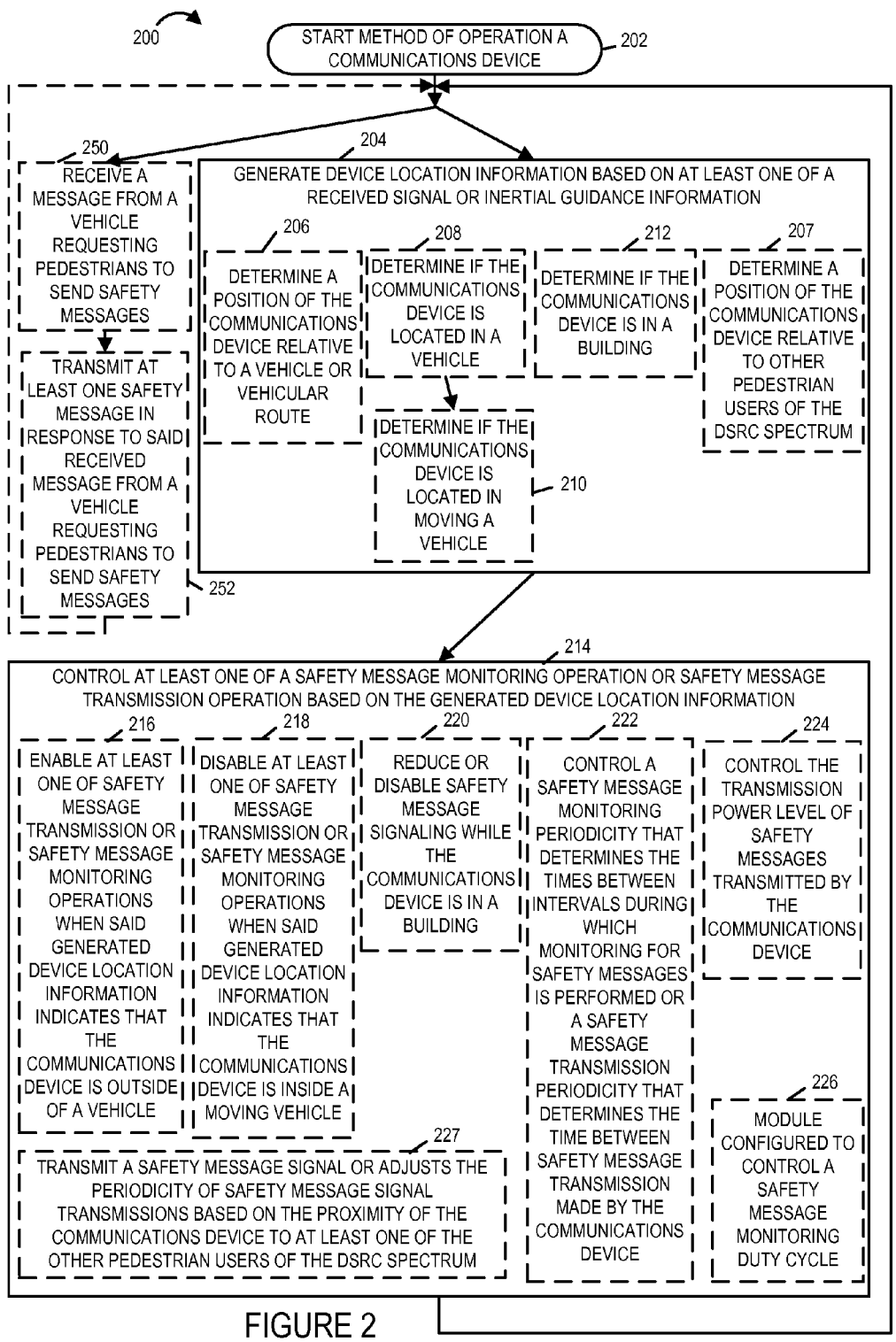
FIG. 2 is a flowchart of an exemplary method of operating a communications device, e.g., a mobile wireless communications device supporting safety message signaling, in accordance with various exemplary embodiments.

FIG. 2 is a flowchart 200 of an exemplary method of operating a communications device in accordance with various embodiments. In some embodiments, the communications device performing the method of flowchart 200 is a mobile communications device, e.g., a portable mobile wireless communications device supporting safety message signaling which may be carried by an individual. For example, the communications device implementing the method of flowchart 200 is one of the mobile wireless communications devices (MN 1 136, MN 2 112, MN 3 193, MN 4 180, ..., MN N 183) of system 100 of FIG. 1. Operation of the exemplary method starts in step 202 where the communications device is powered on and initialized. Operation proceeds from start step 202 to step 204.

In step 204 the communications device generates location information based on at least one of a received signal or inertial guidance information. In some embodiments, the received signal is a GPS signal or a signal received from a cellular network. In some embodiments the received signal is from a non-cellular base station. In some embodiments the received signal is reference signal from a base station. In some embodiments, the received signal communicates the position of the communications device, e.g., a position fix of the communications device determined by a base station or a location determination server, or information that can be used to derive the position of the communications device. In some embodiments, the received signal is an acoustic signal. In some embodiments, the received signal communicates a safety message, e.g., a safety message from a vehicle. In some embodiments, the received signal is from a communications device of a pedestrian. In some such embodiments, the received signal from the pedestrian communicates a safety message. In some embodiments, the received signal is an explicit message from a vehicle requesting pedestrians to send safety messages. In various embodiments, the inertial guidance information is obtained and/or derived from inertial measurements devices included in the communications device, e.g., accelerometers and or gyroscopes. In various embodiments, step 204 includes one or more of all of optional steps 206, 208, 210, 212 and 207. The various steps 206, 208, 210, 212 and 207 may be performed serially, in parallel or in a combination of serial and parallel.

In step 206 the communications device determines a position of the communications device relative to a vehicle or vehicular route. In some embodiments, the generated device location information does not determine the precise location of the communications device, e.g., an absolute location, but determines the location of the communications device relative to a vehicle or vehicular route, e.g., a road, street, train tracks, subway tracks, etc.

In step 208 the communications device determines if the communications device is located in a vehicle, and in step 210 the communications device determines if the communications device is located in a moving vehicle. In some embodiments, determining if the communications device is located in a vehicle is based on at least one of: user input, strength and/or rate of safety messages received from vehicles, a signal received from a safety message system of a vehicle, e.g., the vehicle in which the communications device is located, a determined rate of motion relative to a rate of motion indicative of vehicular motion, or a received acoustic signal indicative of said communications device being within a vehicle.

Various approaches are used to determine if the communications device is located in a vehicle and/or if the vehicle is moving. Several approaches are described below. In some embodiments, the communication device receives a signal from an on-board DSRC device on the vehicle through the safety channel or an external channel signaling that it will be transmitting the safety messages. The communications device checks its own position with respect to the DSRC device and determines that it is within the vehicle.

In some embodiments, the communications device receives GPS signals and identifies that it is traveling at a velocity and/or direction that are beyond pedestrian speeds and/or is experiencing accelerations levels beyond typical pedestrian acceleration patterns and identifies that it is within a vehicle, e.g., a car.

In some embodiments, the communications device receives safety messages from a plurality of vehicles including nearby vehicles and the vehicle in which it is situated. Consider that the communications device observes that one particular vehicle's position and velocity is very close to its own self-determined position and velocity. The communications identifies that it is likely to be within the matching vehicles' confines.

In some embodiments, the communications device broadcasts a request signal which is responded to by the vehicle through 802.11 or Bluetooth or a common communication system. The communications device performs a ranging operation by requesting the vehicle to send out audio signals from the vehicle's speakers helping the communications device identify its position with respect to that vehicle, e.g., determines with an acceptable degree of certainty that the communications device is within the vehicle which is transmitting the audio signals.

In some embodiments, a vehicle transmits a particular audio signal which, when detected, can be used to identify that the communications device is located inside the vehicle.

In some embodiments, the communication device receives a signal from an on-board DSRC device on the vehicle through the safety channel or an external channel signaling that it will be transmitting the safety messages. The communications device checks its own position with respect to the DSRC device and determines that it is within the vehicle.

In step 212 the communications device determines if the communications device is in a building. In various embodiments, the communications device determines if said communications device is located in a building based on at least one of: user input; a received GPS signal and map information identifying the building location, a communications device position fix based on an RF fingerprint map of the building; a received signal from a mobile device known to be within the building; a signal received from a fixed location transmitter within the building; and a received acoustic signal indicative of said communications device being within the building.

In step 207 the communications device determines a position of the communications device relative to other pedestrian users of the DSRC spectrum.

Operation proceeds from step 204 to step 214. In step 214 the communications device controls at least one of a safety message monitoring operation or safety message transmission operation based on the generated device location information. In some embodiments, the safety message is a message including current time, latitude, longitude, speed, heading, vehicle braking information, vehicle throttle information, vehicle steering information, vehicle size information, and/or airbag status information. In some embodiments, a safety message includes acceleration and/or elevation. In some embodiments, the safety message indicates whether the sender is a vehicle or a pedestrian. In some embodiments, the safety message indicates the type of vehicle. In some embodiments, the safety message includes at least some user profile information obtained from a file stored on the communications device. For example, the user profile information may indicate that the user is blind or that the user is handicapped. In some embodiments, a safety message includes some profile information, e.g., information identifying that the person carrying the device which transmits the safety message is walking, information indicating that the person carrying the device which transmits the safety message is cycling, information indicating that the person carrying the device which transmits the safety message is on a particular side of a street, etc. In some embodiments, a safety message indicates an intent, e.g., an intent by a vehicle to change a lane, an intent by a pedestrian to cross a road, etc. In various embodiments, the safety message includes information indicating an intent to cross a road. For example, pushing a button on a cell phone is used to generate a safety message to notify a traffic light and others in an area of an intent to cross a road. In some embodiments, such a safety message may be, and sometimes is, used to control a traffic light, e.g., change a time at which the traffic light changes to allow the pedestrian which initialed the safety message to safety cross the road earlier than would otherwise be the case if the safety message was not sent.

In some embodiments, safety messages transmitted by devices corresponding to pedestrian users include different sets of information than safety messages transmitted by devices corresponding to vehicles. For example, a safety message transmitted by a device corresponding to a pedestrian may include user profile information, e.g., user age information and user disability information, current time, latitude, longitude, heading, while omitting vehicle specific information such as, e.g., vehicle braking information, vehicle throttle information, vehicle steering information, vehicle size information, and/or airbag status information which is normally included in a safety message from a motor vehicle mounted device. Examples of user disability information which may be included in a pedestrian safety message include, e.g., information indicating that the user is blind, information indicating that the user has limited vision, information indicating that the user is wheelchair restricted, information indicating that the user uses a cane, information indicating that the user is deaf, or information indicating that the user is hearing impaired.

Step 214 includes one or more or all of optional steps 216, 218, 220, 222, 224, 226, and 227. In step 216 the communications device enables at least one of safety message transmission or safety message monitoring operations when said generated device location information indicates that the communications device is outside a vehicle. In step 218 the communications device disables at least one of safety message transmission or safety message monitoring operations when said generated device location information indicates that the communications device is inside a moving vehicle. In step 220 the communications device reduces or disables safety message signaling while the communications device is in a building.

In step 222 the communications device controls a safety message monitoring periodicity that determines the time between intervals during which monitoring for safety messages is performed or a safety message transmission periodicity that determines the time between safety message transmission made by the communications device. In some embodiments, the safety message monitoring periodicity or the safety message transmission periodicity is increased when it is determined that the communications device is at a location with higher vehicular traffic than at another location with lower vehicular traffic. In various embodiments, the safety message monitoring periodicity or the safety message transmission periodicity is controlled as a function of proximity to vehicular traffic. In some embodiments, the safety message transmission periodicity is reduced when it is determined that high pedestrian traffic, e.g., above a predetermined threshold, is observed to be using the DSRC band. In some such embodiments, the predetermined threshold is a congestion threshold for pedestrian traffic on the DSRC band.

In step 224 the communications device controls the transmission power level of safety messages transmitted by the communications device. In some embodiments, when the communications device is close to traffic the communications device wants its safety messages to be heard by more devices so it transmits at a higher power level than when it is away from traffic. In some embodiments, if the communications device is far away from vehicle traffic, the communications device decreases its transmit power over the transmit power it would use if it was close to vehicle traffic with regard to safety message transmissions to conserve power and to reduce interference for devices which are more likely to be in traffic.

In step 226 the communications device controls the safety message monitoring duty cycle. In various embodiments, the safety message monitoring duty cycle is controlled as a function of proximity to vehicular traffic, e.g., more safety message monitoring as the communications device approach traffic. In various embodiments, the safety message monitoring duty cycle is controlled as a function of an estimated level of vehicular traffic, e.g., more monitoring for higher levels of detected vehicular traffic. In various embodiments, the safety message monitoring duty cycle is controlled as a function of the percentage of detected utilized monitored safety message channel, e.g., more monitoring for higher detected levels of safety message channel utilization.

In step 226 the communications device transmits a safety message signal or adjusts the periodicity of safety message signal transmissions based on the proximity of the communications device to at least one of the other pedestrian users of the DSRC spectrum.

Operation proceeds from step 214 to step 204 to generate device location information at a later point in time.

In some embodiments, the method of flowchart 200 includes steps 250 and 252. In step 250 the communications device receives a message from a vehicle requesting pedestrians to send safety messages. Operation proceeds from step 250 to step 252. In step 252 the communications device transmits at least one safety message in response to said received message from a vehicle requesting pedestrians to send safety messages. In some embodiments, the received message from the vehicle requesting pedestrians to send safety messages includes information communicating safety message periodicity information and/or safety message transmission power information. In some embodiments, at least some safety message transmission operations are controlled in accordance with step 214.

Figure 3:
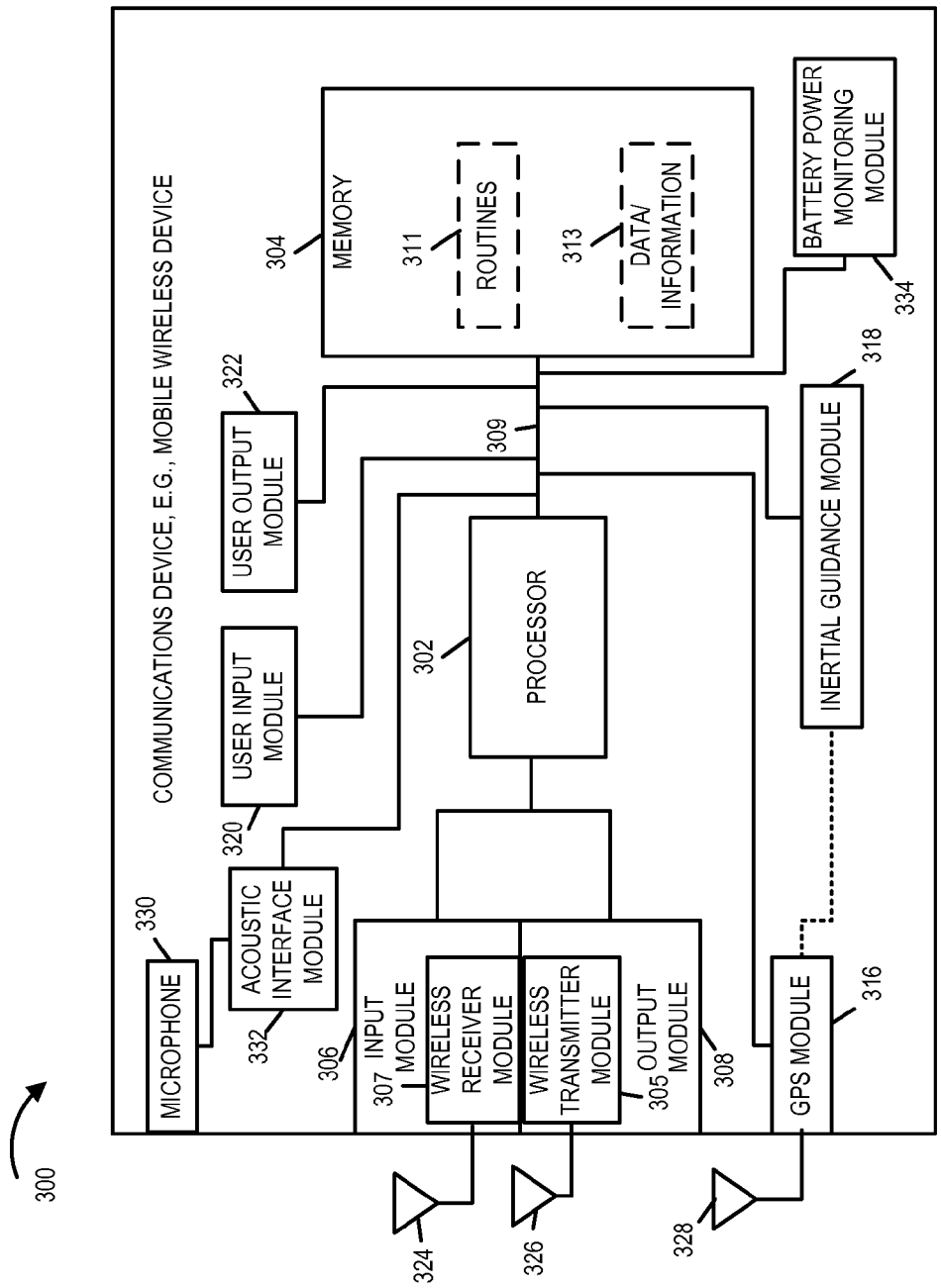
FIG. 3 is a drawing of an exemplary communications device, e.g., a mobile wireless communications device, in accordance with an exemplary embodiment.

FIG. 3 is a drawing of an exemplary communications device 300, e.g., a mobile wireless device, in accordance with an exemplary embodiment. Exemplary communications device 300 is, e.g., one of the portable mobile wireless devices (136, 112, 193, 180, . . . , 183) of system 100 of FIG. 1. Communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wireless receiver 307 for receiving input including safety messages. In some embodiments, input module 306 also includes a wired or optical input interface for receiving input. Output module 308 includes a wireless transmitter 305 for transmitting output including safety messages. In some embodiments, output module 308 also includes a wired or optical output interface for transmitting output. In various embodiments, wireless receiver module 307 and wireless transmitter module 305 form a wireless communications module which supports DSRC signaling, e.g., 802.11p signaling. In some embodiments, memory 304 includes routines 311 and data/information 313.

Communications device 300 further includes wireless communications receive antenna 324 coupled to wireless receiver module 307 and wireless communications transmit antenna 326 coupled to wireless transmitter module 305. In some embodiments, the same antenna is used for both input and output wireless communications signaling. Communications device 300 further includes a GPS module 316 coupled to GPS antenna 328 via which the communications device 300 may receive GPS signals. GPS module 316, e.g., an embedded GPS receiver, processes received GPS signals and outputs GPS information, e.g., GPS time information, GPS determined position fix information, GPS determined velocity information, GPS determined altitude information, GPS determined heading information, and GPS accuracy information. Output GPS information is used in determining device location information.

Inertial guidance module 318, e.g., a module including multiple gyroscopes and multiple accelerometers, provides inertial guidance information used in generating device location information. In some embodiments, the inertial guidance module 318 is included as part of a navigation unit included in communications device 300. In some embodiments, the inertial guidance module 318 includes a plurality of discrete inertial measurement components, e.g., discrete accelerometers and/or gyroscopes. In some embodiments, the inertial guidance module 318 includes a gyroscope on a chip. In some embodiments, the inertial guidance module 318 includes an accelerometer on a chip. In some embodiments, the inertial guidance module 318 is an inertial measurement unit (IMU) on a chip. In some embodiments, the inertial guidance module 318 is included in a chip including processor 302. In various embodiments, the GPS module 316 is coupled to the inertial guidance module 318. In some embodiments, the inertial guidance module 318 aids the GPS module 316, e.g., during intervals of poor GPS reception. GPS module 316 and inertial guidance module 318 are coupled to bus 309.

Communications device 300 further includes a microphone 330 coupled to an acoustic interface module 332, which is coupled to bus 309. Acoustic signals are detected by microphone 330 and processed by acoustic interface module 332. Exemplary detected acoustic signals include, e.g., an acoustic signal corresponding to a transmitter located in a building, an acoustic signal corresponding to a transmitter located in a vehicle, an acoustic signal corresponding to a noise profile indicative of being inside a building, and an acoustic signal corresponding to a noise profile indicative of being inside a vehicle. In some embodiments, received acoustic signals are used to identify that the communications device 300 is located in a building or vehicle. In some embodiments, received acoustic signals are used to perform ranging, e.g., locating the communications device 300 within a vehicle with an acceptable probability.

Communications device 300 further includes a user input module 320 and a user output module 322 coupled to bus 309. User input module 320, e.g., a keypad and/or touch-screen, receives user input, e.g., user input identifying a location, user input identifying that the user is in a building, user input indicating that the user is inside a vehicle, user input indicating that the user intends to cross the street. User output module 322, e.g., a display, presents options to the user in regard to safety message communications, displays safety message information and displays aggregate safety message information.

Communications device 300 further includes a battery power monitoring module 334 configured to determine an amount of remaining battery power for communications device 300. In some embodiments the determined amount of remaining battery power is used by the communications device 300 in controlling at least one of a safety message operation and a safety message transmission operation. For example, in some embodiments, the amount of time in which the communications device's receiver is powered on for the purpose of monitoring for safety messages is controlled as a function of the remaining battery power, e.g., less time for monitoring for low levels of detected battery power. As another example, the rate of transmission of safety messages and/or the power level of transmission for safety messages is controlled to be lower when the level of remaining battery power is detected to be low.

In various embodiments, processor 302 is configured to: generate device location information based on at least one of a received signal or inertial guidance information; and control at least one of a safety message monitoring operation or safety message transmission operation based on the generated device location information. In some embodiments, said safety message is a message including current time, latitude, longitude, speed, heading, vehicle braking information, vehicle throttle information, vehicle steering information, vehicle size information, and/or airbag status information. In some embodiments, said message indicates whether the sender is in a vehicle or is a pedestrian. In various embodiments, said safety message includes at least some user profile information obtained from a file stored on said communications device. In some embodiments, safety message includes information indicating an intent to cross a road.

In various embodiments, processor 302 is configured to determine a position of the communications device relative to a vehicle or vehicular route, as part of being configured to generate the device location information. In some embodiments, processor 302 is configured to control a safety message monitoring periodicity that determines the time between intervals during which monitoring for safety messages is performed or a safety message transmission periodicity that determines the time between safety message transmissions made by said communications device, as part of being configured to control at least one of a safety message monitoring operation or transmission operation.

In some embodiments, processor 302 is configured to increase the safety message monitoring periodicity or the safety message transmission periodicity when it is determined that the communications device is at a location with higher vehicular traffic than at another location with lower vehicular traffic. In various embodiments, processor 302 is configured to control the safety message monitoring periodicity or the safety message transmission periodicity as a function of proximity to vehicular traffic. In some embodiments, processor 302 is configured to reduce the safety message transmission periodicity when it is determined that high pedestrian traffic, e.g., above a predetermined threshold, is observed to be using the DSRC band.

Processor 302, in some embodiments, is configured to control the transmission power level of safety messages transmitted by said communications device, as part of being configured to control at least one of a safety message monitoring operation or safety message transmission operation based on the generated device location information.

In various embodiments, processor 302 is configured to disable at least one of safety message transmission or safety message monitoring operations when said generated device location information indicates that said communications device is inside a moving vehicle, as part of being configured to control at least one of a safety message monitoring operation or safety message transmission operation based on the generated device location information.

In some embodiments, processor 302 is configured to determine if said communications device is located in a vehicle, as part of being configured to generate device location information based on at least one of a received signal or inertial guidance information. In some such embodiments, processor 302 is configured to determine if said communications device is located in a vehicle based on at least one of: user input; strength and/or rate of safety messages received from vehicles; a signal received from a safety message system of a vehicle, e.g., the vehicle in which the communications device is located; a determined rate of motion relative to a rate of motion indicative of vehicular motion; or a received acoustic signal indicative of said communications device being within a vehicle.

In various embodiments, processor 302 is configured to enable at least one of safety message transmission or safety message monitoring operations when said generated device location information indicates that said communications device is outside of a vehicle, as part of being configured to control at least one of a safety message monitoring operation or safety message transmission operation based on the generated device location information.

Processor 302, in some embodiments, is configured to determine if the communications device is in a building, as part of being configured to generate device location information based on at least one of a received signal or inertial guidance information. In some such embodiments, processor 302 is further configured to reduce or disable safety message signaling while the communications device is in the building, as part of being configured to control at least one of a safety message monitoring operation or safety message transmission operation based on the generated device location information. In some embodiments, processor 302 is configured to determine if said communications device is located in a building based on at least one of: user input; a communications device position fix based on an RF fingerprint map of the building; a received signal from a mobile device known to be within a building; a signal received from a fixed location transmitter within a building; and a received acoustic signal indicative of said communications device being within a building.

In some embodiments, processor 302 is configured to determine a position of the communications device relative to other pedestrian users of the DSRC spectrum as part of being configured to generate device location information based on at least one of a received signal or inertial guidance information. In some such embodiments processor 302 is configured to transmit a safety message signal or adjust the periodicity of safety message signal transmissions based on the proximity of the communications device to at least one of the other pedestrian users of the DSRC spectrum.

In some embodiments, processor 302 is configured to receive a message from a vehicle requesting pedestrians to send safety messages. In some such embodiments, processor 302 is further configured to transmit at least one safety message in response to said received message from a vehicle requesting pedestrians to send safety messages.

Figure 4:
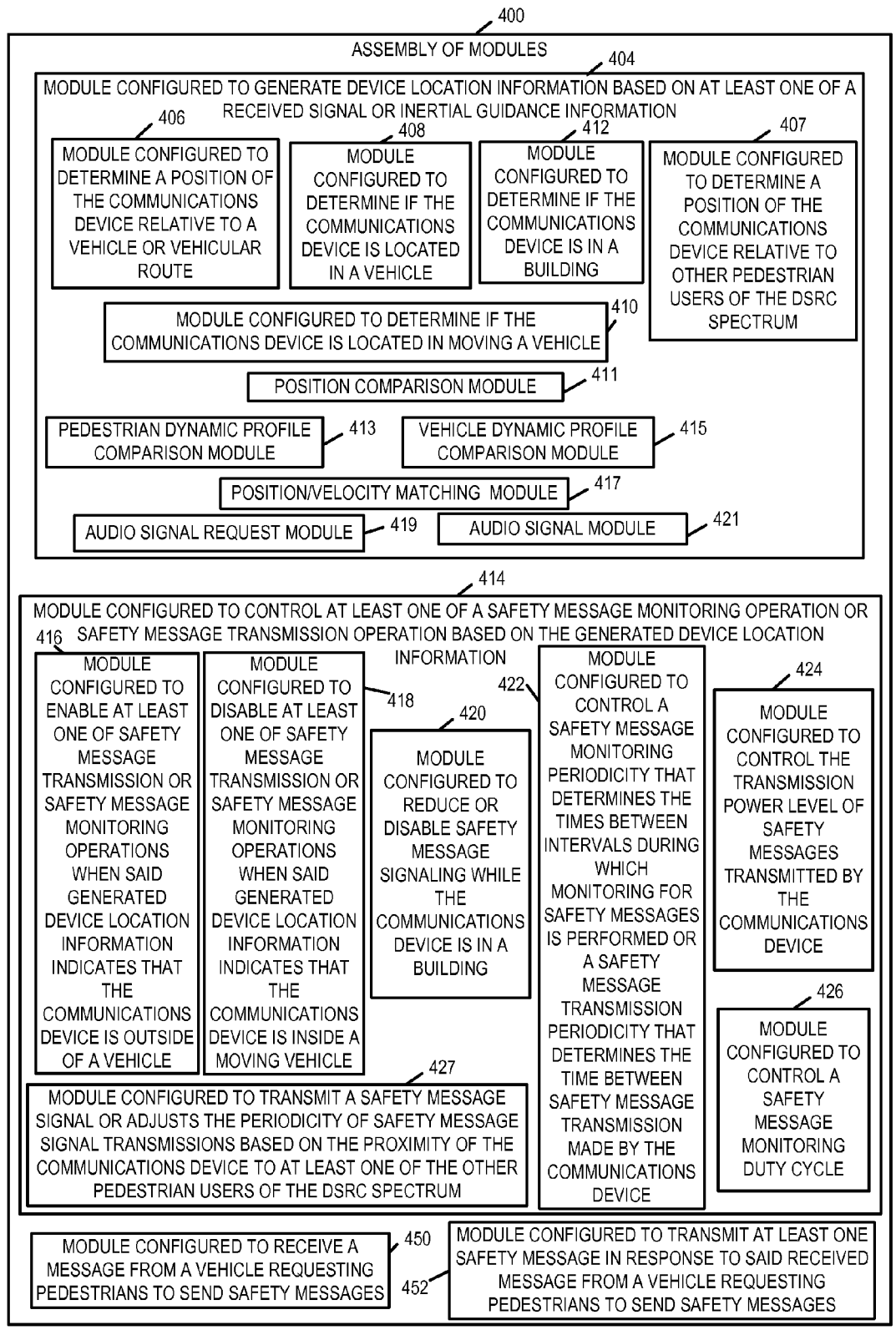
FIG. 4 illustrates an assembly of modules which can, and in some embodiments is, used in the exemplary communications device illustrated in FIG. 3.

FIG. 4 is an assembly of modules 400 which can, and in some embodiments is, used in the exemplary communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated and/or described in the method of flowchart 200 of FIG. 2.

FIG. 4 is an assembly of modules 400 in accordance with various embodiments. Assembly of modules 400 includes a module 404 configured to generate device location information based on at least one of a received signal or inertial guidance information and a module 414 configured to control at least one of a safety message monitoring operation or safety message transmission operation based on the generated device location information. Module 404 includes a module 406 configured to determine a position of the communications device relative to a vehicle or vehicular route, a module 408 configured to determine if the communications device is located in a vehicle, a module 410 configured to determine if the communications device is located in a moving vehicle, a module 412 configured to determine if the communications device is in a building, and a module 407 configured to determine a position of the communications device relative to other pedestrian users of the DSRC spectrum. In some embodiments, one or more of all of modules 406, 408, 410, 412 and 407 are located outside module 404.

Module 404 further includes a position comparison module 411, a pedestrian dynamic profile comparison module 413, a vehicle dynamic profile comparison module 415, a position/velocity matching module 417, an audio signal request module 419 an audio signal module 421. Outputs from one or more of modules 411, 413, 415, 417, 419 and 421 are used by module 406, 408 and/or module 410 to make a determination. Position comparison module 411 is configured to compare the position of the communications device including assembly of modules 400 to a position received from a safety message from a vehicle and determined whether the communications device including assembly of modules 400 is within the vehicle. Pedestrian dynamic profile comparison module 413 is configured to determine the traveling velocity, acceleration, and heading of the communications device in which assembly of modules 400 is located, e.g., based on received GPS signals and/or internal inertial sensors, e.g., gyroscopes and accelerometers, and determine whether or not the velocity exceeds pedestrian speeds, whether or not the determined acceleration profile is outside an expected pedestrian profile, and whether or not the heading is outside a typical pedestrian route, e.g., the route being travelled is along a sidewalk or hiking path. Vehicle dynamic profile comparison module 415 is configured to determine the traveling velocity, acceleration, and heading of the communications device in which assembly of modules 400 is located, e.g., based on received GPS signals and/or internal inertial sensors, e.g., gyroscopes and accelerometers, and determine whether or not the velocity is within the envelope for expected vehicle speeds and whether or not the acceleration profile matches an expected vehicle profile, and whether or not the heading is following a typical vehicle route, e.g., the route being travelled is along a lane of a highway, along a railroad track or along a subway track. In some embodiments, different profiles corresponding to different types of vehicles are stored in memory and the vehicle dynamic profile module 415 identifies which type of vehicle the communications device including assembly of modules 400 is located in, e.g., a car or a train. Position/velocity matching module 417 compares the position and velocity of the communications device including assembly of modules 400 to a plurality of sets of received position/velocity information from received safety messages from a plurality of vehicles in the vicinity and determines which one vehicle has position and velocity which is the best match to the position and velocity information for the communications device including assembly of modules 400, e.g., identifying which vehicle the communications device is located in. Audio signal request module 419 requests, e.g., requests a vehicle, to send audio signals from its speakers to help identify the position of the communications device including assembly of modules 400, e.g., to determine if the communications device including assembly of modules 400 is within the vehicle within an acceptable degree of certainty. Audio signal module 421 performs a ranging operation by processing received audio signals, e.g., received audio signals which were transmitted over a plurality of the vehicle's speakers, e.g., in response to a request, and determines whether or not the communications device including assembly of modules 400 is within the vehicle. In some embodiments, the transmitted audio signals used for ranging are intentionally chosen to use frequencies in a range which are not audibly detectable by the majority of humans but which are detectable by the communications device including assembly of modules 400.

Module 414 includes: a module 416 configured to enable at least one of safety message transmission or safety message monitoring operations when said generated device location information indicates that the communications device is outside a vehicle, a module 418 configured to disable at least one of safety message transmission or safety message monitoring operations when said generated device location information indicates that the communications device is inside a moving vehicle, and a module 420 configured to reduce or disable safety message signaling while the communications device is in a building. Module 414 further includes a module 422 configured to control safety message monitoring periodicity that determines the times between intervals during which monitoring for safety messages is performed or a safety message transmission periodicity that determines the time between safety message transmissions made by the communications device, and a module 424 configured to control the transmission power level of safety messages transmitted by the communications device. Module 414 further includes a module 426 configured to control a safety message monitoring duty cycle. Module 414 further includes a module 427 configured to transmit a safety message signal or adjust the periodicity of safety message signal transmissions based on the proximity of the communications device to at least one of the other pedestrian users of the DSRC spectrum. In some embodiments, one or more of all of modules 416, 418, 420, 422, 424, 426, and 427 are located outside module 414.

In some embodiments said safety message is a message including current time, latitude, longitude, speed, heading, vehicle braking information, vehicle throttle information, vehicle steering information, vehicle size information, and/or airbag status information. In various embodiments, said safety message indicates whether the sender is in a vehicle or is a pedestrian. In some embodiments, said safety message includes at least some user profile information obtained from a file stored on said communications device. In some embodiments, said safety message includes information indicating an intent to cross a road.

In various embodiments, the module 422, configured to control a safety message monitoring periodicity or a safety message transmission periodicity, controls the safety message monitoring periodicity or the safety message transmission periodicity to increase when it is determined that the communications device has moved to a location with higher vehicular traffic from another location with lower vehicular traffic.

In various embodiments, module 422, configured to control a safety message monitoring periodicity or safety message transmission periodicity, controls the safety message monitoring periodicity or the safety message transmission periodicity as a function of proximity to vehicular traffic. In some such embodiments, the control is such that the safety message monitoring or safety message transmission occurs more frequently when the communications device is close to vehicular traffic than when the communications device is far away from vehicle traffic.

In various embodiments, module 422, configured to control a safety message monitoring periodicity or safety message transmission periodicity, controls the safety message monitoring periodicity or the safety message transmission periodicity as a function of vehicular speed in the vicinity. In some such embodiments, the control is such that the safety message monitoring or safety message transmission occurs more frequently when the communications device is in a region with high vehicular speeds than when the communications device is in a region with low vehicular speeds. In some embodiments, the control is such that the safety message monitoring or safety message transmission occurs more frequently when the communications device is in a region with a high posted speed limit than when the communications device is in a region with low posted speed limit.

In various embodiments module 422, configured to control safety message monitoring periodicity or safety message transmission periodicity, controls the safety message monitoring periodicity or safety message transmission periodicity as a function of the type of vehicle or type of vehicles allowed in the vicinity, e.g., bicycle, motorcycle, car, truck, bus, train, tram, and/or subway vehicle. In various embodiments module 422, configured to control safety message monitoring periodicity or safety message transmission periodicity, controls the safety message monitoring periodicity or safety message transmission periodicity as a function of the type of vehicle or type of vehicles detected to be in the vicinity, e.g., bicycle, motorcycle, car, truck, bus, train, tram, and/or subway vehicle.

In some embodiments, module 422 controls the safety message transmission periodicity as a function of the amount of pedestrian traffic observed to be using the DSRC band. In some embodiments, module 422 controls the safety message transmission periodicity to operate at a reduced rate when it is determined that high pedestrian traffic, e.g., above a predetermined threshold, is observed to be using the DSRC band.

In some embodiments, module 408, configured to determine if said communications device is located in a vehicle, determines if the communications device is located in a vehicle based on at least one of: user input; strength and/or rate of safety messages received from vehicles; a signal received from a safety message system of a vehicle; a determined rate of motion relative to a rate of motion indicative of vehicular motion; or a received acoustic signal indicative of said communications device being within a vehicle.

Assembly of modules 400 further includes a module 450 configured to receive a message from a vehicle requesting pedestrians to send safety messages and a module 452 configured to transmit at least one safety message in response to said message from a vehicle requesting pedestrians to send safety messages.

Figure 5:
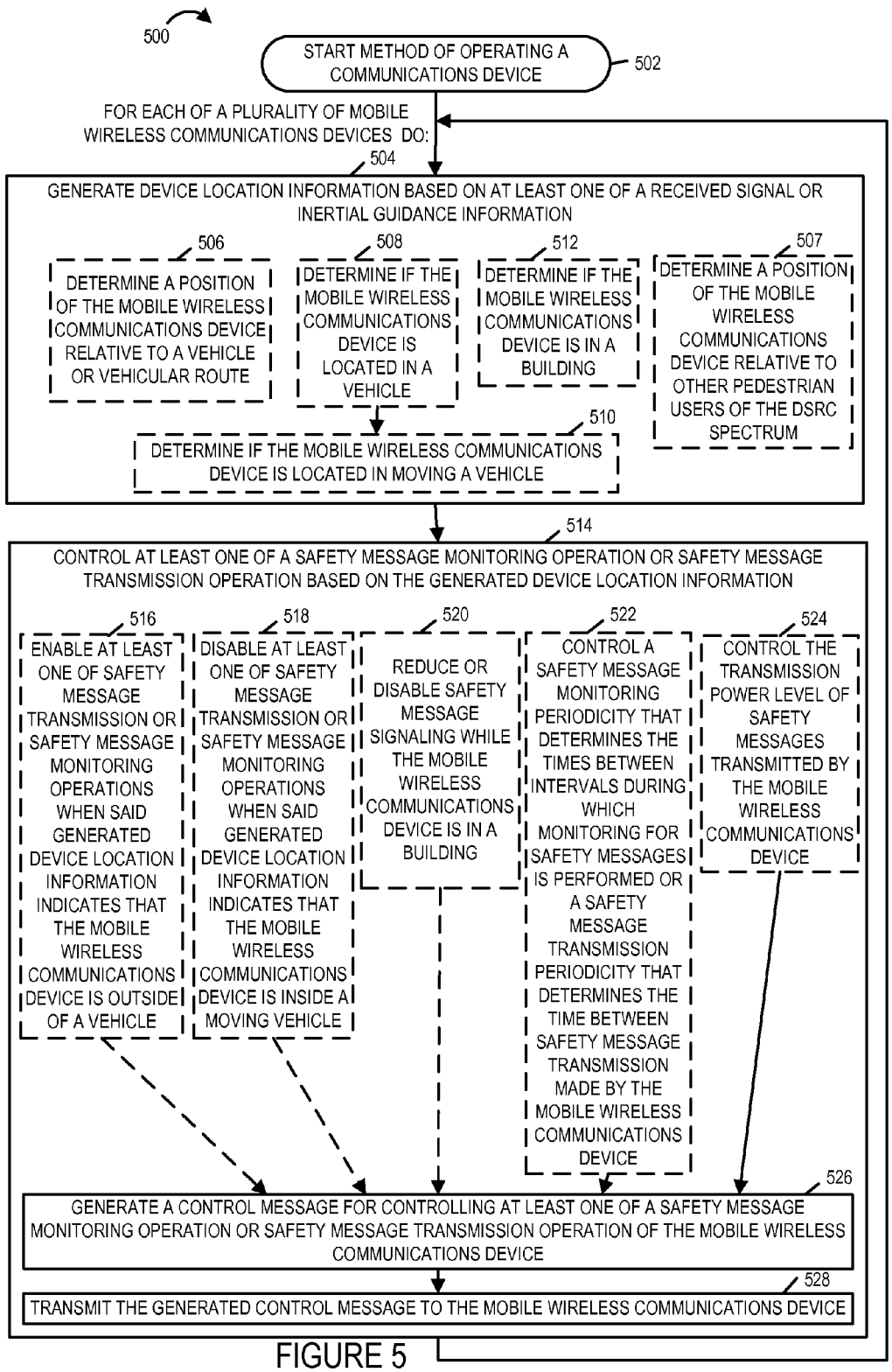
FIG. 5 is a flowchart of an exemplary method of operating a communications device, e.g., a network server or base station which controls a plurality mobile wireless communications devices with regard to safety message signaling, in accordance with various exemplary embodiments.

FIG. 5 is a flowchart 500 of an exemplary method of operating a communications device in accordance with various embodiments. In some embodiments, the communications device performing the method of flowchart 500 is a network node, e.g., a server node or a base station. The communications device performing the method of flowchart 500 is, e.g., server node 130 or base station 126 or base station 105 of system 100 of FIG. 1. Operation of the exemplary method starts in step 502 where the communications device is powered on and initialized. Operation proceeds from start step 502 to step 504. The steps of flowchart 500 may be performed by the communications device for each of a plurality of mobile wireless communications devices which are being controlled by the communications device with regard to at least one safety message monitoring operations or safety message transmission operations. For example, in one embodiment server node 130 is controlling mobile wireless communications devices (MN 1 136, MN 2 112, MN 3 193, MN 4 180, . . . , MN N 183) with regard to safety message monitoring and/or safety message transmission operations.

In step 504 the communications device generates location information based on at least one of a received signal or inertial guidance information. In some embodiments, the received signal is a GPS signal or a signal received from a cellular network. In some embodiments, a mobile wireless communications device determined position fix is communicated to the communications device implementing the method of flowchart 500, e.g., via the cellular network and/or the backhaul. In some embodiments, information used to derive the position of the mobile wireless communications device, e.g., power strength measurements of received reference signals, is communicated from the mobile wireless communications device to the communications device implementing the method of flowchart 500. In some embodiments, a mobile wireless communications device determines its position, e.g., based on GPS and/or inertial measurements, and communicates its determined position to the communications device implementing the method of flowchart 500. In various embodiments, step 504 includes one or more of all of optional steps 506, 508, 510, 512, and 507. In step 506 the communications device determines a position of the mobile wireless communications device relative to a vehicle or vehicular route. In some embodiments, the generated device location information does not determine the precise location of the communications device, e.g., an absolute location, but determines the location of the communications device relative to a vehicle or vehicular route, e.g., a road, street, train tracks, subway tracks, etc. In some embodiments, the communications device implementing the method of flowchart 500, which has a more accurate overall view of the situation in the vicinity of mobile wireless communications device than the mobile wireless communications device, includes a map and is able to locate the mobile communications device relative to other vehicles, streets, etc. In step 508 the communications device determines if the mobile wireless communications device is located in a vehicle, and in step 510 the communications device determines if the mobile wireless communications device is located in a moving vehicle. In some embodiments, determining if the mobile wireless communications device is located in a vehicle is based on at least one of: user input, strength and/or rate of safety messages received from vehicles, a signal received from a safety message system of a vehicle, e.g., the vehicle in which the mobile wireless communications device is located, a determined rate of motion of the mobile wireless communications device relative to a rate of motion indicative of vehicular motion, or a received acoustic signal by the mobile wireless communications device indicative of said mobile wireless communications device being within a vehicle. In step 512 the communications device determines if the mobile wireless communications device is in a building. In various embodiments, the communications device determines if said mobile wireless communications device is located in a building based on at least one of: user input; a communications device position fix based on an RF fingerprint map of the building; a received signal from another mobile wireless communications device known to be within the building; a signal received by the mobile wireless communications device from a fixed location transmitter within the building; and a received acoustic signal by the mobile wireless communications device indicative of said mobile wireless communications device being within the building. In step 507 the communications device determines the position of the mobile wireless communications device relative to the position of other pedestrian users of the DSRC spectrum.

Operation proceds from step 504 to step 514. In step 514 the communications device controls at least one of a safety message monitoring operation or safety message transmission operation based on the generated device location information. In some embodiments, the safety message is a message including current time, latitude, longitude, speed, heading, vehicle braking information, vehicle throttle information, vehicle steering information, vehicle size information, and/or airbag status information. In some such embodiments, the safety message indicates whether the sender is a vehicle or a pedestrian. In some embodiments, the safety message includes at least some user profile information obtained from a file stored on the communications device sending the safety message. For example, the user profile information may indicate that the user is blind or that the user is handicapped. In various embodiments, the safety message includes information indicating an intent to cross a road. For example, pushing a button on a cell phone is used to generate a safety message to notify a traffic light and others in an area of an intent to cross a road.

Step 514 includes one or more or all of optional steps 516, 518, 520, 522, and 524. Step 514 also includes steps 526 and 528. In step 516 the communications device enables at least one of safety message transmission or safety message monitoring operations when said generated device location information indicates that the mobile wireless communications device is outside a vehicle. In step 518 the communications device disables at least one of safety message transmission or safety message monitoring operations when said generated device location information indicates that the mobile wireless communications device is inside a moving vehicle. In step 520 the communications device reduces or disables safety message signaling while the mobile wireless communications device is in a building. In step 522 the communications device controls a safety message monitoring periodicity that determines the time between intervals during which monitoring for safety messages is performed or a safety message transmission periodicity that determines the time between safety message transmission made by the mobile wireless communications device. In some embodiments, the safety message monitoring periodicity or the safety message transmission periodicity is increased when it is determined that the mobile wireless communications device is at a location with higher vehicular traffic than at another location with lower vehicular traffic. In various embodiments, the safety message monitoring periodicity or the safety message transmission periodicity is controlled as a function of proximity of the mobile wireless communications device to vehicular traffic. In various embodiments, the safety message transmission periodicity is controlled as a function of the observed level of pedestrian traffic using the DSRC band. For example, in response to a detected high level of pedestrian traffic using the DSRC band, e.g., above a predetermined pedestrian traffic threshold level, the number of safety messages transmitted from the mobile communications device in a given time interval is reduced, e.g., to reduce congestion in the DSRC band. In step 524 the communications device controls the transmission power level of safety messages transmitted by the mobile wireless communications device. In some embodiments, when the mobile wireless communications device is close to traffic the communications device wants the mobile wireless communication device's safety messages to be heard by more devices so it is controlled to transmit at a higher power level than when the mobile wireless communications device is away from traffic. In some embodiments, if the mobile wireless communications device is far away from vehicle traffic the communications device controls the mobile wireless communications device to decrease its transmit power over the transmit power it would use if it was close to vehicle traffic with regard to safety message transmissions to conserve power and to reduce interference for devices which are more likely to be in traffic.

Operation proceeds from one or more of steps 515, 518, 520, 522 and 524 to step 526. In step 526 the communications device generates a control message for controlling at least one of a safety message monitoring operation or safety message transmission operation of the mobile wireless communications device. In step 526 the communications device incorporates information in the generated control message to implement the decisions of one or more of steps 516, 518, 520, 522 and 524. Operation proceeds from step 526 to step 528. In step 528 the communications device transmits the generated control message to the mobile wireless communications device. In some embodiments, the transmitted message is communicated from the communications device implementing the method of flowchart 500 to the mobile wireless communications device through a backhaul network and a wireless communications channel, e.g., a cellular communications signal. In some embodiments, the control message from the communications device implementing the method of flowchart 500 to the wireless communications device communicates a command, e.g., a command to enable or disable safety message monitoring and/or safety message transmission operations, a command communicating a safety message transmission periodicity, a command communicating safety message monitoring periodicity information, a command indicating a safety message transmission power level, a command communicating a maximum allowed safety message transmission periodicity, a command indicating a maximum allowed safety message transmission power level. Operation proceeds from step 514 to step 504 to generate device location information corresponding to the mobile wireless communications device at a later point in time.

In some embodiments, including step 507, the communications device controls the mobile wireless communications device to transmit a safety message signal or controls the mobile wireless communications device to adjust the periodicity of safety message signal transmissions based on the proximity of the mobile wireless communications device to at least one of the pedestrian uses of the DSRC spectrum. In some such embodiments, control information to implement the control is included in a generated control message in step 526 and the generated control message is transmitted in step 528.

Figure 6:
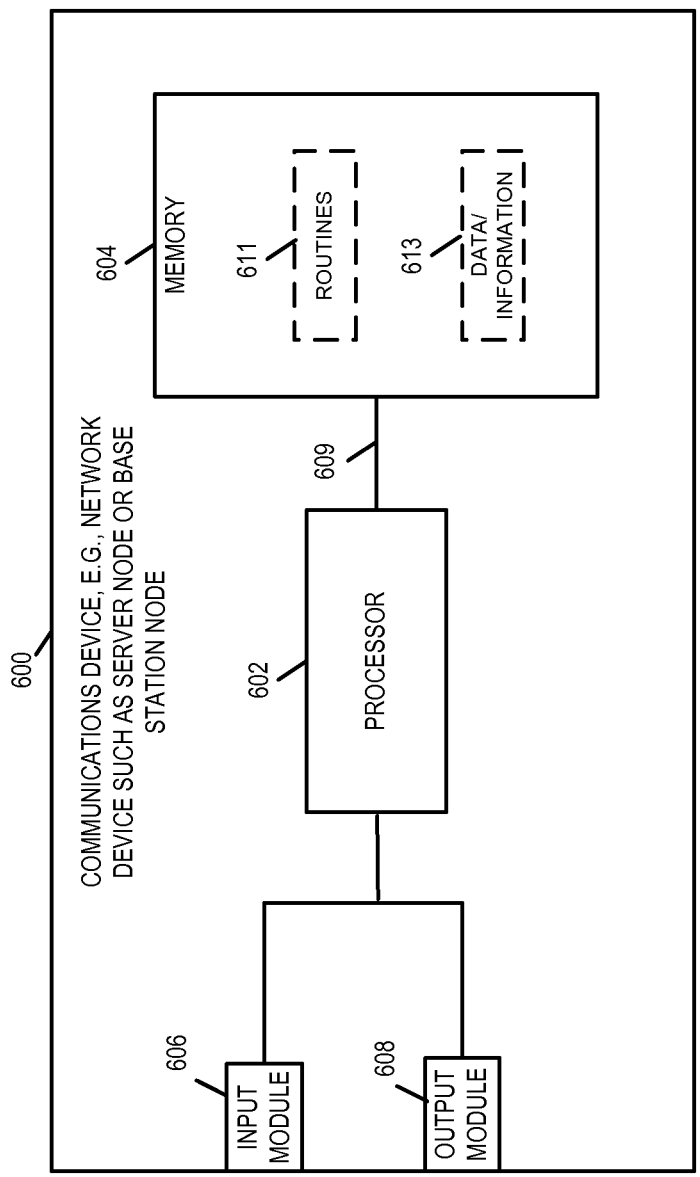
FIG. 6 is a drawing of an exemplary communications device, e.g., a network server or base station, in accordance with an exemplary embodiment.

FIG. 6 is a drawing of an exemplary communications device 600, e.g., network device such as a server node or base station node, in accordance with an exemplary embodiment. Exemplary communications device 600 is, e.g., one of server nodes or base station nodes of system 100 of FIG. 1. Communications device 600 may, and sometimes does, implement a method in accordance with flowchart 500 of FIG. 5. Communications device 600 controls at least one of safety message monitoring operations or safety message transmission operations for a plurality of mobile wireless communications devices.

Communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output. In some embodiments, memory 604 includes routines 611 and data/information 613.

In various embodiments, processor 602 is configured to: generate device location information based on at least one of a received signal or inertial guidance information; and control at least one of a safety message monitoring operation or safety message transmission operation based on the generated device location information. In some embodiments, said safety message is a message including current time, latitude, longitude, speed, heading, vehicle braking information, vehicle throttle information, vehicle steering information, vehicle size information, and/or airbag status information. In some such embodiments, said message indicates whether the sender is in a vehicle or is a pedestrian. In various embodiments, said safety message includes at least some user profile information obtained from a file stored on said communications device transmitting the safety message. In some embodiments, safety message includes information indicating an intent to cross a road by the device transmitting the safety message.

In various embodiments, processor 602 is configured to determine a position of a mobile wireless communications device relative to a vehicle or vehicular route, as part of being configured to generate the device location information. In some embodiments, processor 602 is configured to control a safety message monitoring periodicity that determines the time between intervals during which monitoring for safety messages is performed or a safety message transmission periodicity that determines the time between safety message transmissions made by said mobile wireless communications device, as part of being configured to control at least one of a safety message monitoring operation or transmission operation.

In some embodiments, processor 602 is configured to increase the safety message monitoring periodicity or the safety message transmission periodicity when it is determined that the mobile wireless communications device is at a location with higher vehicular traffic than at another location with lower vehicular traffic. In various embodiments, processor 602 is configured to control the safety message monitoring periodicity or the safety message transmission periodicity of the mobile wireless communications device as a function of proximity to vehicular traffic.

Processor 602, in some embodiments, is configured to control the transmission power level of safety messages transmitted by said mobile wireless communications device, as part of being configured to control at least one of a safety message monitoring operation or safety message transmission operation based on the generated device location information.

In various embodiments, processor 602 is configured to disable at least one of safety message transmission or safety message monitoring operations of the mobile wireless communications device when said generated device location information indicates that said mobile wireless communications device is inside a moving vehicle, as part of being configured to control at least one of a safety message monitoring operation or safety message transmission operation based on the generated device location information.

In some embodiments, processor 602 is configured to determine if said mobile wireless communications device is located in a vehicle, as part of being configured to generate device location information based on at least one of a received signal or inertial guidance information. In some such embodiments, processor 602 is configured to determine if said mobile wireless communications device is located in a vehicle is based on at least one of: user input; strength and/or rate of safety messages received from vehicles; a signal received from a safety message system of a vehicle (e.g., the vehicle in which the communications device is located); a determined rate of motion of the mobile wireless communications device relative to a rate of motion indicative of vehicular motion; or a received acoustic signal received by the mobile wireless communications device indicative of said mobile wireless communications device being within a vehicle.

In various embodiments, processor 602 is configured to enable at least one of safety message transmission or safety message monitoring operations for the mobile wireless communications device when said generated device location information indicates that said mobile wireless communications device is outside of a vehicle, as part of being configured to control at least one of a safety message monitoring operation or safety message transmission operation based on the generated device location information.

Processor 602, in some embodiments, is configured to determine if the mobile wireless communications device is in a building, as part of being configured to generate device location information based on at least one of a received signal or inertial guidance information. In some such embodiments, processor 602 is further configured to reduce or disable safety message signaling while the mobile wireless communications device is in the building, as part of being configured to control at least one of a safety message monitoring operation or safety message transmission operation based on the generated device location information. In some embodiments, processor 602 is configured to determine if said mobile wireless communications device is located in a building based on at least one of: user input; a position fix of the mobile wireless communications device based on an RF fingerprint map of the building; a received signal from another mobile device known to be within a building; a signal received by the mobile wireless communications device from a fixed location transmitter within a building; and a received acoustic signal indicative of said mobile wireless communications device being within a building.

In some embodiments, processor 602 is configured to determine the location of the mobile wireless communications device relative to the position of other pedestrian users of the DSRC spectrum. In some such embodiments, processor 602 is further configured to control the mobile wireless communications device to transmit a safety message signal or adjust the periodicity of safety message signaling based on the proximity of the mobile wireless communications device to at least one other pedestrian user of the DSRC spectrum.

In various embodiments, processor 602 is configured to generate a control message for controlling at least one of a safety message monitoring operation or a safety message transmission operation of the mobile wireless communications device, e.g., a control message communicating control decisions with regard to safety message monitoring activation and rates and/or with regard to safety message transmission activation, rates, and transmission power levels for the mobile wireless communications device being controlled. Processor 602 is further configured to transmit, e.g., directly or indirectly, the generated control message to the mobile wireless communications device being controlled.

Figure 7:
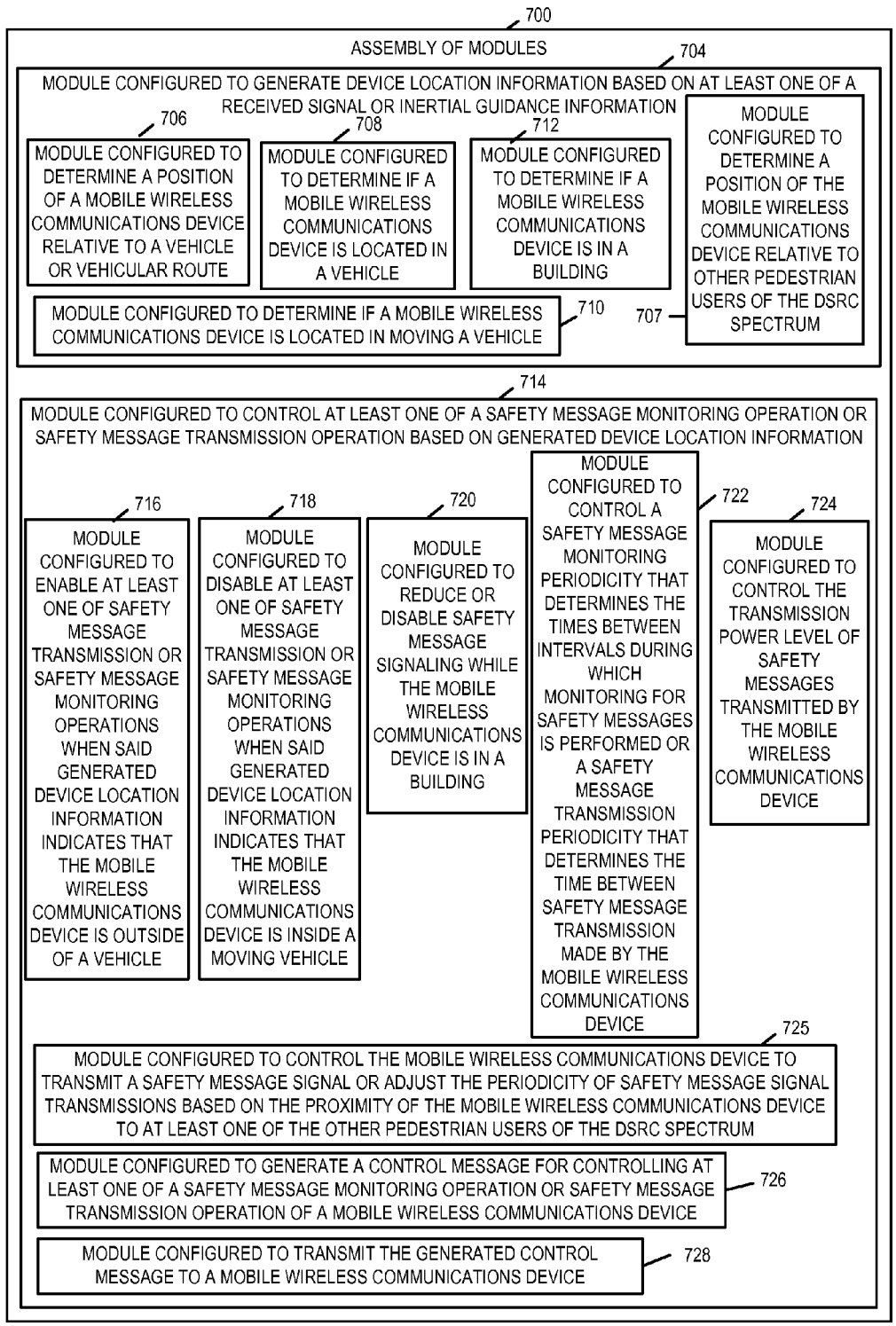
FIG. 7 illustrates an assembly of modules which can, and in some embodiments is, used in the exemplary communications device illustrated in FIG. 6.

FIG. 7 is an assembly of modules 700 which can, and in some embodiments is, used in the exemplary communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of communications device 600 shown in FIG. 6. In some such embodiments, the assembly of modules 700 is included in routines 611 of memory 604 of device 600 of FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium, e.g., a non-transitory computer readable medium, comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated and/or described in the method of flowchart 500 of FIG. 5.

FIG. 7 is an assembly of modules 700 in accordance with various embodiments. Assembly of modules 700 includes a module 704 configured to generate device location information based on at least one of a received signal or inertial guidance information and a module 714 configured to control at least one of a safety message monitoring operation or safety message transmission operation based on the generated device location information. Module 704 includes a module 706 configured to determine a position of a mobile wireless communications device relative to a vehicle or vehicular route, a module 708 configured to determine if the mobile wireless communications device is located in a vehicle, a module 710 configured to determine if the mobile wireless communications device is located in a moving vehicle, and a module 712 configured to determine if the mobile wireless communications device is in a building. Module 704 includes a module 707 configured to determine the position of the mobile wireless communications device relative to the position of other pedestrian users of the DSRC spectrum. In some embodiments, one or more of all of modules 706, 708, 710, 712, and 707 are located outside module 704.

Module 714 includes a module 716 configured to enable at least one of safety message transmission or safety message monitoring operations when said generated device location information indicates that the mobile wireless communications device is outside a vehicle, a module 718 configured to disable at least one of safety message transmission or safety message monitoring operations when said generated device location information indicates that the mobile wireless communications device is inside a moving vehicle, and a module 720 configured to reduce or disable safety message signaling while the mobile wireless communications device is in a building. Module 714 further includes a module 722 configured to control safety message monitoring periodicity that determines the times between intervals during which monitoring for safety messages is performed or a safety message transmission periodicity that determines the time between safety message transmissions made by the mobile wireless communications device and a module 724 configured to control the transmission power level of safety messages transmitted by the mobile wireless communications device. Module 714 further includes a module 725 configured to control the mobile wireless communications device to transmit a safety message signal or adjust the periodicity of safety message signal transmissions based on the proximity of the mobile wireless communications device to at least one of the other pedestrian users of the DSRC spectrum.

Module 714 further includes a module 726 configured to generate a control message for controlling at least one of a safety message monitoring operation or a safety message transmission operation of a mobile wireless communications device and a module 728 configured to transmit the generated control message to a mobile wireless communications device. In some embodiments, one or more of all of modules 716, 718, 720, 722, 724, 725, 726 and 728 are located outside module 714.

In some embodiments a safety message is a message including current time, latitude, longitude, speed, heading, vehicle braking information, vehicle throttle information, vehicle steering information, vehicle size information, and/or airbag status information. In various embodiments, a safety message indicates whether the sender is in a vehicle or is a pedestrian. In some embodiments, said safety message includes at least some user profile information obtained from a file stored on the device which transmitted the message. In some embodiments, said safety message includes information indicating an intent to cross a road.

In various embodiments, the module 722, configured to control a safety message monitoring periodicity or a safety message transmission periodicity, controls the safety message monitoring periodicity or the safety message transmission periodicity to increase when it is determined that the mobile wireless communications device has moved to a location with higher vehicular traffic from another location with lower vehicular traffic.

In various embodiments, module 722, configured to control a safety message monitoring periodicity or safety message transmission periodicity, controls the safety message monitoring periodicity or the safety message transmission periodicity as a function of proximity of the mobile wireless communications device to vehicular traffic. In some such embodiments, the control is such that the safety message monitoring or safety message transmission is controlled to occur more frequently when the mobile wireless communications device is close to vehicular traffic than when the mobile wireless communications device is far away from vehicle traffic.

In various embodiments, module 722, configured to control a safety message monitoring periodicity or safety message transmission periodicity, controls the safety message monitoring periodicity or the safety message transmission periodicity as a function of vehicular speed in the vicinity of the mobile wireless communications device that is being controlled. In some such embodiments, the control is such that the safety message monitoring or safety message transmission occurs more frequently when the mobile wireless communications device is in a region with high vehicular speeds than when the mobile wireless communications device is in a region with low vehicular speeds. In some embodiments, the control is such that the safety message monitoring or safety message transmission occurs more frequently when the mobile wireless communications device is in a region with a high posted speed limit than when the mobile wireless communications device is in a region with low posted speed limit.

In various embodiments module 722, configured to control safety message monitoring periodicity or safety message transmission periodicity, controls the safety message monitoring periodicity or safety message transmission periodicity as a function of the type of vehicle or type of vehicles allowed in the vicinity of the mobile wireless communications device being controlled, e.g., bicycle, motorcycle, car, truck, bus, train, tram, subway vehicle, etc. In various embodiments module 722, configured to control safety message monitoring periodicity or safety message transmission periodicity, controls the safety message monitoring periodicity or safety message transmission periodicity as a function of the type of vehicle or type of vehicles detected to be in the vicinity of the mobile wireless communications device being controlled, e.g., bicycle, motorcycle, car, truck, bus, train, tram, subway train, etc.

In some embodiments, module 722 is configured to control the safety message transmission periodicity as a function of the amount of observed pedestrian traffic using the DSRC band in the vicinity of the mobile wireless communications device being controlled. For example, for observed high levels of pedestrian traffic using the DSRC band in the vicinity of the mobile wireless communications device being controlled the mobile wireless communications device being controlled is controlled to transmit safety messages less frequently, e.g., to reduce congestion.

In some embodiments, module 708, configured to determine if a mobile communications device is located in a vehicle, determines if a mobile wireless communications device is located in a vehicle based on at least one of: user input to the mobile wireless communications device; strength and/or rate of safety messages received from vehicles by the mobile wireless communications device; a signal received from a safety message system of a vehicle by the mobile wireless communications device; a determined rate of motion of the mobile wireless communications device relative to a rate of motion indicative of vehicular motion; or a received acoustic signal received by said mobile wireless communications device indicative of said mobile wireless communications device being within a vehicle.

Various aspects and/or features of some, but not necessarily all embodiments, are further described below. In some embodiments, the power and/or periodicity of a safety message sent by a wireless device is adjusted according to the environment. The environmental inputs which may be, and sometimes are, used include, e.g., GPS signals received by the wireless device, wireless device inertial system measurements made by instruments such as gyroscopes and accelerometers which can be used to predict the position of a pedestrian with the wireless device, and basic safety messages from other vehicles, e.g., 802.11p transmissions from vehicles.

For example, if GPS signals used in conjunction with maps indicate that the user is within a building or in an indoor setting the transmissions of safety messages, in some embodiments, is completely switched off or reduced, e.g., reduced to less than one transmission a second. In addition to GPS signals, the phone's inertial systems such as gyroscopes may be used to predict the position/direction of travel of a pedestrian. If the pedestrian is not close to the road traffic, the periodicity may be reduced and increased at a later point in time when the pedestrian gets close to road traffic again. The detection of road traffic basic safety messages from other vehicles, e.g., 802.11p transmissions from the other vehicles, and their received power may, and sometimes is, also used, to indicate how close to the road/traffic the users are.

Various exemplary embodiments, may, and sometimes do, use one or more or all of the above inputs to identify when a pedestrian's mobile wireless device is to be controlled to transmit safety messages, e.g., when the pedestrian attempts to cross the road, and to reduce the periodicity to a low value, e.g., 1 transmission per second or lower, if identified not to be in a traffic related scenario.

Since a significant amount of energy is also spent in keeping the receiver for the 802.11p signal on, it can be useful to regulate the receiver duty cycle in the wireless device based on its environment, particularly when battery drain is an important consideration. Controlling the reception duty cycles can also utilize the inputs from the above inputs, e.g., GPS, gyroscope/accelerometer, and detected 802.11p transmissions. The duty cycle of observing the safety transmissions may be, and in some embodiments, is reduced based on the estimated position/activity of the pedestrian, and if he/she is in proximity to roads and traffic.

Further, the duty-cycle of observing the 802.11p transmissions may be based on the density of the channel occupancy within the observed duration and also the received power. For example, if a phone receiver is in a current state of observing the channel for 100 ms duration every 1 second and within this 100 ms duration it observes a channel occupancy greater than 50%, it implies that the receiver is close to vehicular transmissions. Channel occupancy can be measured from vehicles (the measurement is more reliable) or from other pedestrians (this is less reliable).

Similarly, if basic safety message (BSM) packets from a few vehicles are received at very high power, it again implies that the pedestrian is very close to vehicular traffic, and as a response, the duty cycle, in some embodiments, is increased and the receiver is kept in an ON state for a longer fraction of the time.

Similarly, if the 802.11p basic safety messages become extremely weak or the channel occupancy is really low, the pedestrian device switches to a lower periodicity of hearing the channel.

Various aspects and/or features of controlling transmission of safety messages will be further discussed below. In some embodiments, the power and periodicity of a pedestrian transmitter is controlled based on the identified environment and situation the pedestrian is in. Exemplary inputs used to identify the environment include: GPS signals received by the phone/device, measurement by the phone/device's inertial system components such as measurements by gyroscopes and accelerometers which are used to predict the position of a pedestrian, and the detection of road traffic basic safety messages from other vehicles, e.g., 802.11p transmissions from other vehicles.

If the GPS signals used in conjunction with maps indicate that the user is within a building or in an indoor setting, in some embodiments, the transmissions of safety messages are either completely switched off or reduced, e.g., reduced to less than one transmission a second. In addition to GPS signals, the phone's inertial systems such as gyroscopes are used to predict the position/direction of travel of a pedestrian. If the pedestrian is not very close to the road traffic, the periodicity is reduced and may be increased at a later point in time when the user gets closer to the road traffic. The detection of road traffic basic safety messages from other vehicles, e.g., 802.11p transmissions, and their received power also indicate how close to the road/traffic the users are.

Various embodiments, use one or more or all the above inputs to identify when a pedestrian's mobile wireless communications device is controlled to transmit safety messages, e.g., when the pedestrian attempts to cross the road, and to reduce the periodicity to a low value, e.g., 1 transmission per second or lower, if identified to be not in a traffic related scenario.

Various aspects and/or features of some embodiments of controlling reception of safety messages, e.g., switching the receiver on to receive safety messages, is further discussed below. Since a significant amount of energy is also spent in keeping the receiver for the 802.11p signal on, it is useful to regulate the receiver duty cycle in the mobile wireless communications device based on its environment.

Controlling the reception duty cycles, in some embodiments, utilizes the inputs from the above inputs, e.g., GPS inputs, gyroscope/accelerometer inputs, 802.11p transmission detection information. The duty cycle of observing the safety message transmissions can be, and in some embodiments, is reduced based on the estimated position and/or estimated activity of the pedestrian and if he/she is in proximity to roads and traffic.

Further, the duty-cycle of observing the 802.11p transmissions, e.g., monitoring 802.11p transmission, in some embodiments, is based on the density of the channel occupancy within the observed duration and also the received power. For example, in some embodiments, if a mobile phone receiver is in a current state of observing the channel for a 100 ms duration every 1 second and within this 100 ms duration it observes a channel occupancy greater than 50%, it implies that the receiver is close to vehicular transmissions. Similarly, if BSM packets from a few vehicles are received at very high power, it again implies that the pedestrian is very close to vehicular traffic, and, in some embodiments, as a response, the duty cycle is increased and the receiver is kept in an ON state for a longer fraction of the time.

Similarly, if the detected 802.11p basic safety messages observed by the monitoring become extremely weak or the channel occupancy is observed to be really low, in some embodiments, the pedestrian device switches to a lower periodicity of hearing, e.g., monitoring, the channel.

The issues of controlling transmission of a portable wireless communications device vary depending on whether the device is located inside a vehicle, e.g., inside a car with DSRC communications capability. Various features are directed to determining if a portable device, e.g., cellphone, is within a vehicle, e.g., a car in which case it may disable its DSRC safety messaging capability for the period of time it is within the car.

In some embodiments, a cellphone device can identify that it is within a moving vehicle, e.g., a moving car. In some such embodiments, the cellphone shuts off its DSRC safety messages in response to determining that it is within a moving vehicle which is transmitting and monitoring for DSRC messages.

In one embodiment, the cellphone device receives a signal from the on-board DSRC device on the vehicle through the safety channel or an external channel signaling that it will be transmitting the safety messages. The cellphone checks its own position with respect to the DSRC device and determines that it is within the vehicle and switches off its safety broadcasts.

In another embodiment, the cellphone device receives its GPS signals and identifies that it is traveling at a velocity and direction that is beyond pedestrian speeds and typical pedestrian acceleration patterns and identifies that it is within a vehicle, e.g., a car. It then switches the DSRC messaging off or reverts to a very low frequency update.

In another embodiment, the cellphone device receives safety messages from nearby vehicles but observes that a given vehicles position and velocity is very close to its own position and velocity and identifies that it is within that car's confines. The cellphone, in this scenario, switches the DSRC safety message broadcast off.

In another embodiment, the cellphone device broadcasts a request signal which is responded to by the vehicle through 802.11 or Bluetooth or a common communication system. It then performs a ranging operation by requesting the vehicle to send out audio signals from its speakers helping it identify its position with respect to that car. If the cellphone device identifies that it is within the confines of the car to some acceptable level of confidence, it switches off its transmissions of basic safety messages.

In one embodiment, the cellphone device receives a signal from the on-board DSRC device on the vehicle through the safety channel or an external channel signaling that it will be transmitting the safety messages. The cellphone checks its own position with respect to the DSRC device and determines that it is within the vehicle and switches off its safety message broadcasts.

In various embodiments a communications device in system 100 of FIG. 1, and/or communication device 300 of FIG. 3, and/or a communications device 600 of FIG. 6 and/or one of the communications device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device, comprising:
    generating device location information based on at least one of a received signal or inertial guidance information; and
    controlling at least one of a safety message monitoring operation or a safety message transmission operation based on the generated device location information, said step of controlling including controlling: (i) a safety message monitoring periodicity that determines a rate at which monitoring for safety messages is performed and a safety message monitoring duty cycle based on the generated device location information or (ii) a safety message transmission periodicity that determines a rate at which safety message transmissions are made by said communications device; and
    wherein the safety message monitoring periodicity or the safety message transmission periodicity is increased when it is determined that the communications device is at a location with higher vehicular traffic than at another location with lower vehicular traffic.

2. The method of claim 1, wherein the safety message monitoring periodicity or the safety message transmission periodicity is controlled as a function of proximity to vehicular traffic.

3. The method of claim 1, wherein controlling at least one of a safety message monitoring operation or a safety message transmission operation based on the generated device location information includes:
    controlling a transmission power level of safety messages transmitted by said communications device.

4. The method of claim 1, wherein controlling at least one of a safety message monitoring operation or a safety message transmission operation based on the generated device location information includes:
    disabling at least one of safety message transmission or safety message monitoring operations when said generated device location information indicates that said communications device is inside a moving vehicle.

5. The method of claim 4, wherein generating device location information based on at least one of a received signal or inertial guidance information includes:
    determining if said communications device is located in a vehicle.

6. The method of claim 5, wherein determining if said communications device is located in a vehicle is based on at least one of:
    user input;
    strength and/or rate of safety messages received from vehicles;
    a signal received from a safety message system of a vehicle;
    a determined rate of motion relative to a rate of motion indicative of vehicular motion; or
    a received acoustic signal indicative of said communications device being within a vehicle.

7. The method of claim 4, wherein controlling at least one of a safety message monitoring operation or a safety message transmission operation based on the generated device location information includes:
    enabling at least one of safety message transmission or safety message monitoring operations when said generated device location information indicates that said communications device is outside of a vehicle.

8. A communications device, comprising:
    means for generating device location information based on at least one of a received signal or inertial guidance information; and
    means for controlling at least one of a safety message monitoring operation or a safety message transmission operation based on the generated device location information, said means for controlling at least one of a safety message monitoring operation or transmission operation including: means for controlling a safety message monitoring duty cycle based on the generated device location information and means for controlling a safety message monitoring periodicity that determines a rate at which monitoring for safety messages is performed or a safety message transmission periodicity that determines a rate at which safety message transmissions are made by said communications device; and
    wherein said means for controlling a safety message monitoring periodicity that determines a rate at which monitoring for safety messages is performed or a safety message transmission periodicity that determines a rate at which safety message transmissions are made by said communications device controls the safety message monitoring periodicity or the safety message transmission periodicity to increase when it is determined that the communications device has moved to a location with higher vehicular traffic from another location with lower vehicular traffic.

9. The communications device of claim 8, wherein said means for controlling a safety message monitoring periodicity or a safety message transmission periodicity controls the safety message monitoring periodicity or the safety message transmission periodicity as a function of proximity to vehicular traffic.

10. The communications device of claim 8, wherein said means for controlling at least one of a safety message monitoring operation or a safety message transmission operation based on the generated device location information includes:
    means for controlling the transmission power level of safety messages transmitted by said communications device.

11. A computer program product for use in a communications device, the computer program product comprising:
a non-transitory computer readable medium comprising:
code for causing at least one computer to generate device location information based on at least one of a received signal or inertial guidance information; and
code for causing said at least one computer to control at least one of a safety message monitoring operation or safety message transmission operation based on the generated device location information, said code for causing said at least one computer to control at least one of a safety message monitoring operation or transmission operation including code for causing said at least one computer to control a safety message monitoring periodicity that determines a rate at which monitoring for safety messages is performed or a safety message transmission periodicity that determines a rate at which safety message transmissions are made by said communications device, and code for causing said at least one computer to control a safety message monitoring duty cycle based on the generated device location information; and
wherein said code for causing said at least one computer to control a safety message monitoring periodicity or a safety message transmission periodicity causes said at least one computer to increase the safety message monitoring periodicity or the safety message transmission periodicity when it is determined that the communications device is at a location with higher vehicular traffic than at another location with lower vehicular traffic.

12. A communications device comprising:
at least one processor configured to:
generate device location information based on at least one of a received signal or inertial guidance information;
control at least one of a safety message monitoring operation or a safety message transmission operation based on the generated device location information, said processor being configured to control a safety message monitoring periodicity that determines a rate at which monitoring for safety messages is performed or a safety message transmission periodicity that determines a rate at which safety message transmissions are made by said communications device, and control a safety message monitoring duty cycle based on the generated device location information, as part of being configured to control at least one of a safety message monitoring operation or transmission operation; and
increase the safety message monitoring periodicity or the safety message transmission when it is determined that the communications device is at a location with higher vehicular traffic than at another location with lower vehicular traffic; and
memory coupled to said at least one processor.

13. The communications device of claim 12, wherein said at least one processor is configured to control the safety message monitoring periodicity or the safety message transmission periodicity as a function of proximity to vehicular traffic.

14. The communications device of claim 12, said at least one processor is configured to control the transmission power level of safety messages transmitted by said communications device, as part of being configured to control at least one of a safety message monitoring operation or a safety message transmission operation based on the generated device location information.

* * * * *